US011211702B1

(12) United States Patent
Mahanfar et al.

(10) Patent No.: US 11,211,702 B1
(45) Date of Patent: Dec. 28, 2021

(54) OVERLAPPING MULTIBAND PHASED ARRAY ANTENNAS

(71) Applicant: Amazon Technologies, Inc., Seattle, WA (US)

(72) Inventors: Alireza Mahanfar, Kirkland, WA (US); Gordon Coutts, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 16/711,393

(22) Filed: Dec. 11, 2019

(51) Int. Cl.
 *H01Q 1/36* (2006.01)
 *H01Q 3/30* (2006.01)
 *H01Q 5/40* (2015.01)
 *H04B 7/15* (2006.01)
 *H01Q 3/26* (2006.01)
 *H04B 7/185* (2006.01)
 *H01Q 3/36* (2006.01)

(52) U.S. Cl.
 CPC ............ *H01Q 3/2617* (2013.01); *H01Q 3/36* (2013.01); *H04B 7/18523* (2013.01)

(58) Field of Classification Search
 CPC .......... H01Q 1/38; H01Q 3/26; H01Q 3/2629; H01Q 3/30; H01Q 5/40; H01Q 5/42; H01Q 9/04; H01Q 9/0407; H01Q 1/36; H04B 7/15; H04B 7/155; H04B 7/185; H04B 7/18523
 See application file for complete search history.

(56) References Cited

U.S. PATENT DOCUMENTS

| | | | | |
|---|---|---|---|---|
| 5,434,580 A | * | 7/1995 | Raguenet | H01Q 5/42 343/700 MS |
| 6,114,998 A | * | 9/2000 | Schefte | H01Q 9/0414 343/700 MS |
| 7,034,753 B1 | * | 4/2006 | Elsallal | H01Q 21/0006 343/700 MS |

* cited by examiner

*Primary Examiner* — Blane J Jackson
(74) *Attorney, Agent, or Firm* — Kilpatrick Townsend & Stockton, LLP

(57) ABSTRACT

A communication system can include a support structure, a receiving phased array antenna, and a transmitting phased array antenna that is physically superimposed with the receiving phased array antenna on the support structure. The receiving phased array antenna can include a plurality of receiving antennas and/or transmitting/receiving antennas, and the transmitting phased array antenna can include a plurality of transmitting/receiving antennas and/or transmitting antennas, with at least a subset of transmitting/receiving antennas shared between the two phased array antennas. Appropriate spacing between the antennas of the receiving and transmitting phased array antennas can be achieved by overlaying the transmitting phased array antenna with a rotational offset compared to the receiving phased array antenna, and the different spacing of the antennas in the receiving phased array antenna and the transmitting phased array antenna permits the use of each array in different frequency bands.

20 Claims, 12 Drawing Sheets

OVERLAPPING MULTIBAND PHASED ARRAY ANTENNAS

BACKGROUND

Phased array antennas are used for a variety of communication and sensing applications due to their ability to transmit or sense a focused beam, and to do so directionally without the necessity of moving parts and without the phased array antenna changing physical orientation. Directionality of transmission or reception can be achieved by sequentially signaling individual antenna elements of the phased array antenna to transmit or to listen in a pattern. In the transmitting case, the phased transmissions generates coherent waves of electromagnetic radiation in one direction. In the receiving case, the antenna elements can extract a signal from incident electromagnetic radiation received by the array when focused in the direction from which a transmission is received. One application of phased array antennas is for communication with satellites, which can be used as a platform for telecommunications, weather observation, imaging, geolocation, and other uses. However, existing phased array antenna systems are cumbersome and prohibitively complex for many use cases. New approaches are therefore warranted to reduce the size and complexity of phased array systems, particularly for satellite communication.

BRIEF DESCRIPTION OF THE DRAWINGS

Various embodiments in accordance with the present disclosure will be described with reference to the drawings, in which.

DETAILED DESCRIPTION

Figure 1:
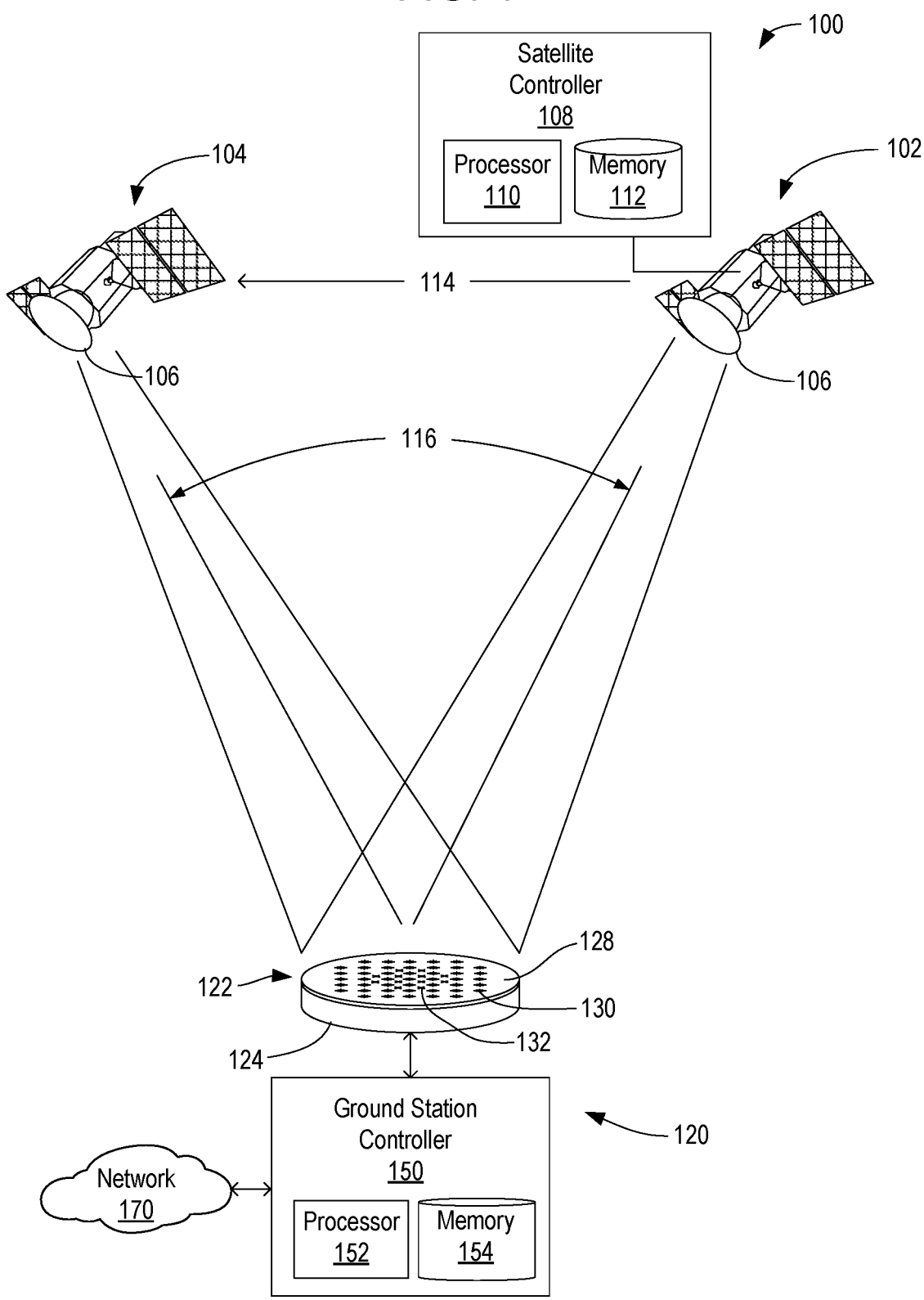
FIG. 1 illustrates an example of a satellite communication system including a ground station and satellite, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, phased array antennas that include at least two, and potentially more, overlapping phased arrays that can be used to transmit and/or receive data from satellite communications or from other communications. The overlapping phased arrays can have different antenna elements spacings that are suitable for transmitting and/or receiving data transmissions at different frequency bands without sacrificing gain or angular range of the phased arrays. The overlapping phased arrays can be installed on a common antenna substrate, which can be a printed circuit board that may include micro electro-mechanical system (MEMS) transmitters and/or receivers. According to some embodiments, a phased array antenna with overlapping antenna arrays may be a printed circuit board with transmitters and/or receivers that are fabricated separately from and then connected to the antenna substrate. According to various other embodiments, a phased array antenna may be a printed circuit board with transmitters and/or receivers that are microfabricated in the layers of the printed circuit board.

In a multi-band phased array antenna containing two overlapping antenna arrays, (i.e., a dual band phased array antenna,) the first phased array is arranged along a first grid pattern, and the second phased array is arranged along a second grid pattern that is at a nonzero angle with respect to the first grid pattern and nested within the first grid pattern. According to some embodiments, the first and second phased arrays can share a subset of transmitters and/or receivers. Depending on the difference between the antenna element densities desired between the first and second phased arrays, a variety of rotational offsets may be used. More than two phased arrays may be nested on the same substrate using different rotational offsets to achieve more than two operating frequency bands.

In one example of a satellite communication system, a ground station can be used to communicate with a communications satellite. The ground station has a dual band phased array antenna made up of two antenna arrays. Each of the antenna arrays is a phased array antenna made up of numerous small antennas that are laid out in a pattern. The two arrays overlap with each other on the same structure, but one of the antenna arrays is rotated with respect to the other array, so that it uses up space that would otherwise be empty between the individual antennas. Each antenna array can transmit or receive in a particular frequency band, and the two frequency bands are different from each other. When the ground station communicates with the satellite, the ground station can use one of the two antenna arrays to transmit data, and can use the other antenna array to receive data. Both antenna arrays can use electronic steering in order to "point" at the satellite continuously as it passes overhead.

The use of overlapping dual band or multiband phased array antennas on the same antenna substrate confers several technical advantages. One such advantage is that placing multiple arrays on the same substrate significantly reduces the number of parts required for a dual band or multiband communication system. Concurrently, this reduction in complexity makes it easier to install a ground station, and simpler to calibrate and use the ground station. For example, two overlapping phased array antennas that share the same substrate can be leveled as a unit, calibrated together, and in some cases one of the overlapping antenna arrays can be used to provide targeting information for steering the other antenna array. Two overlapping phased array antennas sharing the same substrate may also be coplanar, i.e., manufactured at the same layer of a printed circuit board, or installed on the same surface of a common support structure or printed circuit board. Alternatively, overlapping phased array antennas can be non-coplanar, but situated at fixed orientations with respect to each other (e.g., parallel). Although overlapping dual band phased array antennas may be more complex to design than single band antenna arrays, overall material use and complexity of manufacture for a single dual band phased array antenna is less than the material use and complexity of manufacturing two separate phased array antennas, particularly with regard to phased array antennas that are microfabricated. Specific embodiments of communication systems utilizing overlapping phased arrays are described below with reference to the figures.

FIG. 1 illustrates an example of a satellite communication system 100 including a ground station 120 that includes a communication device and multiple satellites, according to embodiments of the present disclosure. The communication system 100 includes at least a first satellite 102 and a second satellite 104. The first satellite 102 proceeds along a path 114 corresponding to the first satellite's orbit around the earth. The path passes through an arc 116, which is a section of the cone defining the range of the ground station 120. While the first satellite 102 is within the arc 116, the first satellite can communicate with the ground station 120. The second satellite 104 is shown exiting the 116, thus exiting the range of the ground station 120. The ground station 120 uses a multiband phased array antenna 122. The phased array antenna 122 has a set of transmitters and a different set of transceivers, where some of the transmitters and transceivers overlap on the same antenna substrate 128. In this way multiple phased array antennas, e.g., first antenna array 130 and second antenna array 132, can be placed on the same substrate 128. The first antenna array 130 and second antenna array 132 are suitable for transmitting or receiving at different frequency bands. The resulting multiband phased array antenna 122 has a smaller footprint than multiple single-band phased array antennas, but can provide the transmit and receive functionality of two separate antennas.

It will be understood that the satellite communication system 100 can include any suitable number of satellites, which may be arranged to form a satellite communication network, and may be spaced in orbit so that a satellite of the satellite communication network is either always or routinely in range to communicate with any given ground station of the satellite communication system. Similarly, the satellite communication system 100 can include any suitable number of ground stations 120, which may be spaced geographically so that any particular ground station can be in communication with at least one satellite of a satellite network at any given time. The ground station 120 can be an end-user or consumer ground station programmed to receive data or media, including streaming media, from the satellite 102, or to upload data or media to the satellite; or the ground station 120 can be a commercial ground station programmed to upload data or media to a satellite network for distribution to end users or consumers.

Each one of the satellites 102, 104 includes a satellite antenna assembly 106 for communicating with the ground station 120, and a satellite processing system 108 for decoding, processing, and encoding data for transmissions between satellites and between each satellite and the ground station 120 or other ground stations. The satellite processing system 108 can include at least one processor 110 and at least one memory device 112 containing suitable executable instructions for receiving and processing communication data and for controlling the satellite antenna assembly 106 for receiving and/or transmitting data. Signal processing hardware and signal processing methods are described below with reference to, e.g., FIG. 3 and FIGS. 7-11, respectively.

The ground communication assembly 120 includes a phased array antenna 122 operably connected with signal processing hardware 124 for processing electrical signals sent to the phased array antenna for transmission from a ground station controller 150, and for processing electrical signals received from the phased array antenna for relaying to the ground station controller. Signal processing hardware 124 is described in more detail below, and can generally include signal amplifiers and/or conditioners that are electrically connected with the phased array antenna 122, and may additionally be connected to external sources of electrical power.

The phased array antenna 122 includes an antenna substrate 128, which may be a substantially flat structural member or printed circuit board (PCB) to which antenna elements can be mounted. The phased array antenna 122 further includes a first antenna array 130 and a second antenna array 132 that may be coplanar on the antenna substrate 128. According to various embodiments of the present disclosure, the first antenna array 130 is a receiving antenna array configured to receive transmitted signals from a signal source (e.g. a satellite, another ground station, aircraft, or other signal source), and the second attendant array 132 is a transmitting antenna array configured to transmit signals from the ground communication assembly 120 for receipt by a signal target (e.g. a satellite, another ground station, aircraft, consumer device, or other suitable signal target). Alternatively, the first antenna array 130 can be a transmitting antenna array, and the second antenna array 132 can be a receiving antenna array.

According to various embodiments, the first antenna array 130 can occupy a larger footprint or planar area on the antenna substrate 128 then the second antenna array 132. The first antenna array 130 and the second antenna array 132 may also be configured to operate preferentially in two different frequency bands. For example, the first antenna array 130 can be configured to operate in a low frequency band (e.g. 15 to 20 GHz, or 17 to 20 GHz), which may be used for receiving signals, whereas the second antenna array 132 can be configured to operate in a high frequency band (e.g. 27 to 30 GHz), which may be used for transmitting signals. The larger planar area of the first antenna array 130 can allow for a larger antenna lattice spacing, for receiving in the low frequency band; and the smaller planar area of the second antenna array 132 can be sufficient to pack transmitting antennas into a relatively tight antenna lattice spacing for transmitting in the high frequency band.

Specific lattice spacings can be selected to optimize downlink and uplink performance based on the transmission frequency bands for sending and receiving data, i.e. the uplink frequency band and downlink frequency band, respectively. In particular, lattice spacings can be selected to maximize the scan angle of each of the first and second antenna arrays 130, 132. Specific examples of lattice arrangements are described with reference to the figures below. According to some embodiments, the lattice arrangements of the first and second antenna arrays 130, 132 are selected to permit a scan angle of at least 51° off of boresight (39° elevation), preferably at least 55° off of boresight (35° elevation). The scan angle for the ground communication assembly 120 at least partly defines the range of the ground communication assembly for tracking the satellite 102, i.e., defining the arc 116. Thus, while the ground communication assembly 120 can be installed in any orientation that allows the phased array antenna 122 to track a target, the ground communication assembly is preferably installed substantially flat (i.e., with the boresight pointing upward) on a level surface, or at least with the phased array antenna 122 substantially leveled, for satellite communications. For other applications, the phased array antenna 122 may be installed at any suitable angle that permits the phased array antenna to scan in the direction of its target receiver.

The ground station controller 150 can include at least one computing system having a processor 152 and a memory device 154 containing executable instructions for controlling the phased array antenna 122. For example the ground station controller 150 can include storage media and/or networking devices for communicating with network 170 from which stored data can be accessed for transmission or to which transmitted data can be written upon receipt. The ground station controller 150 can further include software modules configured to interact with the signal processing hardware 124 in order to compress and/or encode data for transmission, or to decode received data. The ground station controller 150 can further include software modules configured to control the antenna arrays 130, 132 in order to steer the arrays, which can include modulating the phase difference between antenna elements on the antenna substrate to steer the beam transmitting a signal in the transmitting case, or to adjust the scanning direction (i.e., the direction of maximum gain) for scanning to determine the direction from which a signal is received or for receiving transmissions.

Performance characteristics of the antenna arrays 130, 132 are driven in part by the specific geometries of the antenna array elements, described in more detail below with reference to FIGS. 2-6.

Figure 2:
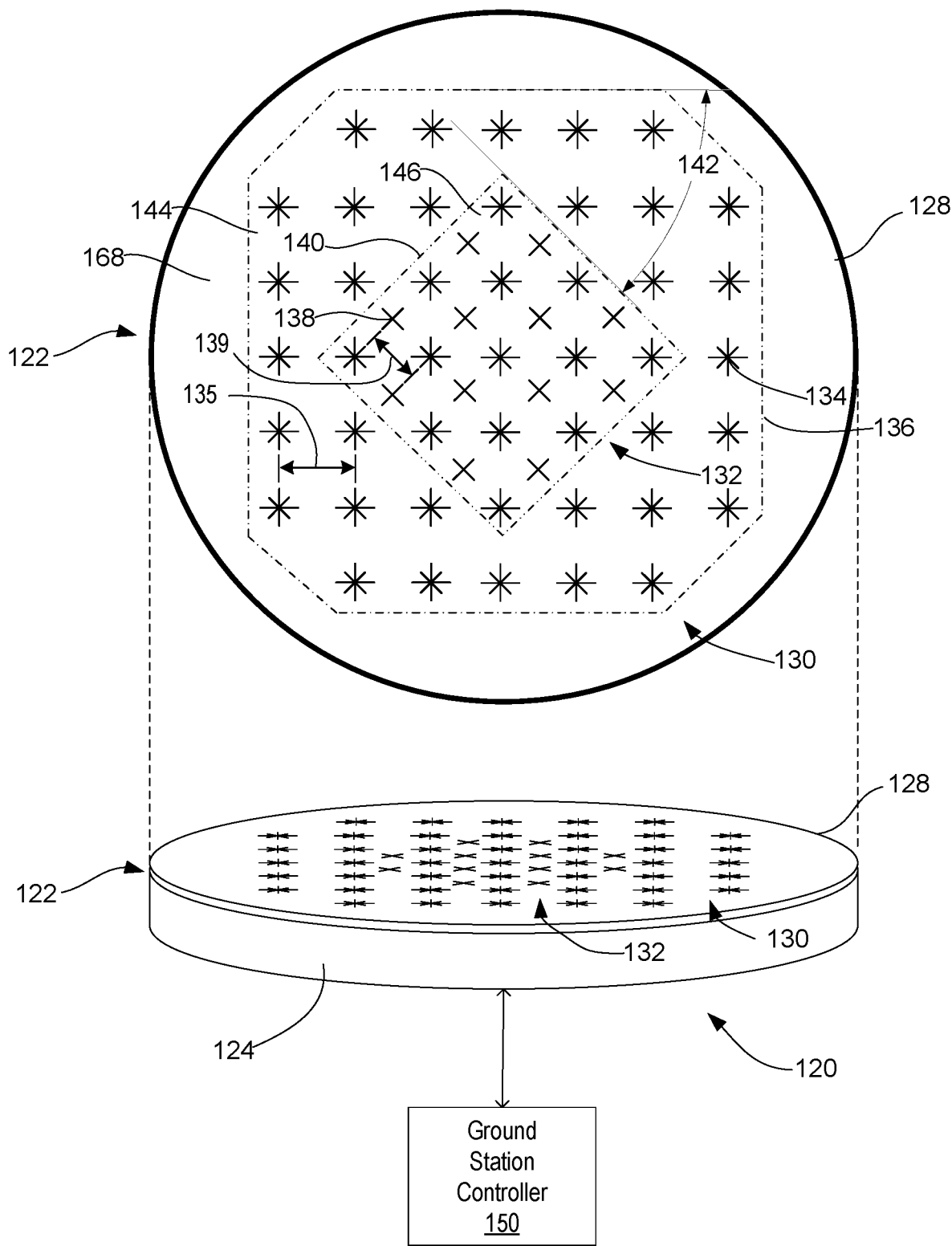
FIG. 2 illustrates an example of an overlapping dual-band phased array antenna assembly, according to embodiments of the present disclosure.

FIG. 2 illustrates the overlapping dual-band phased array antenna 122 of FIG. 1 in greater detail, according to embodiments of the present disclosure. Elements of FIG. 1 are again shown in FIG. 2 with the same element numbers. FIG. 2 shows a phased array antenna 122 that includes an antenna substrate 128 that supports a first antenna array 130 and a second antenna array 132 that overlaps with the first antenna array, where the second antenna array is rotated 45° with respect to the first antenna array.

According to various embodiments, the antenna substrate 128 of the phased array antenna 122 can be a circular or substantially circular platform (i.e., having a circular shape, oval, or elliptical; or having a polygonal shape). Alternative antenna substrates may have a variety of shapes, e.g. square, rectangular; although printed or microfabricated antenna substrates may preferably be circular. The first antenna array 130 is formed of a first plurality of transmitting and receiving antennas 134 (TRx) schematically denoted with the star symbol. Transmitting and receiving antennas as described herein can include, for example, overlapping transmitting and receiving antennas, dual-resonant elements rather than separate antennas, or other suitable element capable of both transmitting and receiving. The transmitting and receiving antennas 134 forming the first antenna array 130 are arranged in a lattice or first grid 136 having a first grid area 144. The second antenna array 132 is formed of a second plurality of transmitting antennas 138 (Tx), schematically denoted 'x', in combination with a subset of the transmitting and receiving antennas 134 that are aligned with the second plurality of transmitting antennas in a second lattice or second grid 140 having a second grid area 146. According to various embodiments the first grid area 144 is smaller than a substrate area 168; and the second grid area 146 is smaller than the first grid area. The second grid 140 can be partially or fully contained within the first grid 136. According to some embodiments, the second grid 140 and the first grid 136 are concentric.

Each one of the first antenna array 130 and second antenna array 132 has a unique orientation, and a rotational offset 142 of the second antenna array with respect to the first antenna array allows the second antenna array to be nested, partially or fully, within the first, and sharing a subset of the individual antennas making up the first antenna array. The orientation of each one of the first antenna array 130 and second antenna array 132 can be described with reference to a repeating pattern of antennas, for example, any row of antennas making up the respective array. An antenna array based on a square grid or a rectangular grid, for example, has an orientation corresponding to a direction in which the rows of the grid are laid out. Antenna arrays based on other shapes can also be described in terms of a repeating pattern of antennas, e.g., triangular arrays, hexagonal arrays, rhomboid or other quadrilateral arrays, and so on.

The rotational offset 142 can be defined in terms of the lattice or grid making up each of the antenna arrays 130, 132. For example, in a square grid made up of rows and columns, the rotational offset 142 is defined in terms of the angle between any row of the first antenna array 130 and any intersecting row of the second antenna array 132. For example, in the phased array antenna 122, the first antenna array 130 contains individual antennas arrayed in the first grid 136, and the second antenna array 132 contains individual antennas arrayed in the second grid 140. The second grid 140 can have a different orientation than the first grid 136, whereby the second plurality of transmitting antennas 138 and adjacent subset of the first plurality of transmitting and receiving antennas 134 are arranged in rows and columns that are rotationally offset with respect to those in the first grid 136. According to some embodiments, the second grid 140 can have an angle of rotational offset 142 with respect to the first grid 136 of between 40° and 50°, preferably about 45°. If the first grid 136 and second grid 140 are each perfectly square, the rotational offset 142 will be 45°. In embodiments having a rotational offset 142 of about 45°, the denser second grid 140 can be characterized by spacing between transmitting antennas 138 and adjacent transmitting and receiving antennas 134 that is about 70% of the spacing between adjacent transmitting/receiving antennas.

The spacing of individual antennas in a phased array antenna is driven in part by the desired transmission frequency of the array, and may be limited by the thermal load produced by individual antennas and the ability of the antenna substrate 128 to conduct heat away from the antennas. According to some embodiments, an ideal spacing for adjacent antenna array elements is about one half of the wavelength associated with the transmission frequency band. As the spacing between adjacent antenna array elements approaches the ideal spacing, the maximum scan angle of the phased array antenna increases. Increasing the spacing between adjacent antenna array elements by a small amount above the half wavelength ideal spacing can improve thermal properties (i.e. reduce thermal loading on the antenna substrate) without significantly reducing the scan angle of the phased array antenna. For example according to various embodiments, the phased array antenna can achieve the scan angle of at least 51° off of boresight using an antenna array spacing of between 0.52 and 0.56 of the transmission wavelength.

According to at least one embodiment, where the first antenna array 130 operates in the range of 17 to 20 GHz, a first grid spacing 135 corresponding to the transmitting and receiving antennas 134 can be in the range of 7.5 mm to 8.5 mm, preferably about 8 mm, preferably 7.98 mm. Similarly, where the second antenna array 132 operates in the range of 27 to 30 GHz, a second grid spacing 139 corresponding to the transmitting antennas 138 and the subset of transmitting and receiving antennas 134 in the second grid 140 can be in the range of 5 to 6 mm, preferably about 5.5 mm, preferably about 5.66 mm. Thermal loading may primarily drive the spacing of the antennas in the second grid 140 but not the first grid 136, due to the closer spacing in the second grid. In such cases, the second grid spacing 139 may be driven by the minimum required scan angle of the phased array antenna and the thermal loading. If the grid spacing is not driven by the thermal loading of the denser second grid 140, the first grid spacing 135, being larger, can be closer to an ideal spacing of the first antenna array 130.

Figure 3:
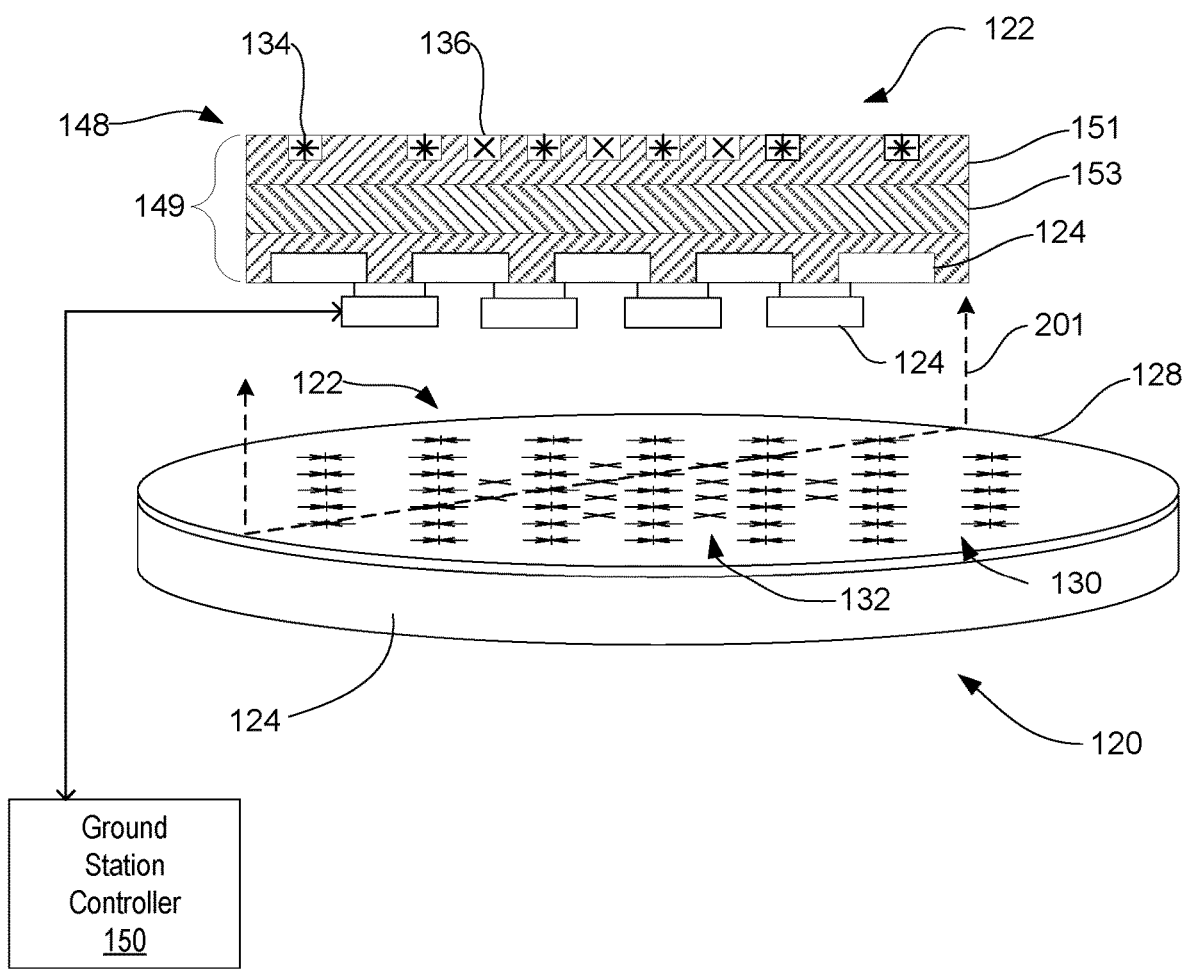
FIG. 3 is a simplified side section schematic of a portion of an overlapping dual-band phased array antenna assembly, according to embodiments of the present disclosure.

FIG. 3 is a simplified side section schematic of a portion of an overlapping dual-band phased array antenna 122, according to embodiments of the present disclosure. As shown, the antenna substrate 128 can be a printed circuit board (PCB) 148 that electrically connects the transmitting and receiving antennas 134 and the transmitting antennas 138 with signal processing hardware 124, that is electrically connected with the ground station controller 150. The printed circuit board 148 is shown in a simplified side section along plane 201 through the antenna substrate 128. It will be understood that FIG. 3 is a simplified representation showing the relative locations of components of the printed circuit board 148 that omits internal detail and is not to scale.

According to various embodiments, the printed circuit board 148 includes a plurality of layers 149 including at least a set of antenna layers 151 positioned at a superior surface of the antenna substrate 128, and a set of signal distribution layers 153 positioned beneath the antenna layers. According to some embodiments, signal processing hardware 124 can be microfabricated into the printed circuit board 148 as an additional set of layers beneath the signal distribution layers 153, can be microfabricated or installed on an inferior surface of the printed circuit board 148 beneath the signal distribution layers, or a combination of the above.

The set of antenna layers 151 at the superior surface of the antenna substrate 128 include the transmitting and receiving antennas 134 as well as the transmitting antennas 138, which are preferably microfabricated in or on the printed circuit board 148 in the same plane as each other. According to some embodiments, the transmitting and receiving antennas 134 and the transmitting antennas 138 can be formed by any suitable micro electromechanical system (MEMS) fabrication technique, such as, but not limited to: lithography, chemical etching, and/or deposition techniques. The first and second antenna arrays 130, 132 can be formed as a series of antenna elements (e.g. microstrip or dipole antenna elements, or other suitable microscale antenna elements) formed in a dielectric layer (or layers) of the set of antenna layers 151 and integrally connected or bonded with a silicon wafer containing a series of matching electrical connections of the signal distribution layers 153 configured to electrically connect the antenna layers 151 with the signal processing hardware 124. According to some embodiments, the first grid 136 and the second grid 140 can define respective attachment points for the first antenna array 130 and second antenna array 132 on the superior surface of the antenna substrate 128, the attachment points including electrical connections for powering the antenna elements or for transmitting signals from the antenna elements to the signal processing hardware 124.

Signal processing hardware 124 can include a series of antennas filters, signal conditioners, and power amplifiers configured to receive a signal for transmission from the ground station controller 150, relay and amplify the signal for transmission by the transmitting antennas 138 and the subset of transmitting and receiving antennas 134 of the phased array antenna 122. According to some embodiments, the signal processing hardware 124 can also take as input from the ground station controller 150 the desired scan angle, and can delay the signal emission across any transmitting antennas according to their position on the antenna substrate 128 by a partial wavelength, the amount of delay between adjacent antennas corresponding to the scan angle of transmission. The signal processing hardware 124 can include onboard processing (i.e. processors and memory containing software, hardcoded instructions, or firmware) that can process data from the ground station controller including the desired scan angle in order to automatically adjust the scan angle of transmission. Alternatively, the ground station controller 150 may process the desired scan angle and generate instructions to directly control the delay of signal emission across the transmitting antennas in order to control the scan angle of transmission.

Conversely, in the receiving case, the signal processing hardware 124 can sense electrical signals relayed from the transmitting and receiving antennas 134 that correspond to a received signal, and can rectify the received signal and relay the received signal to the ground station controller 150. According to some embodiments, the signal processing hardware 124 can listen to the signals received from the transmitting and receiving antennas 134 with a partial wavelength delay across the receiving antennas according to their position on the antenna substrate 128, the amount of delay between adjacent receiving antennas corresponding to the scan angle at which the phased array antenna is receiving.

The gain of the phased array antenna 122 is related to the number of individual antenna elements in addition to their spacing and distribution on the antenna substrate 128. Therefore, according to various embodiments, the number of individual antenna elements may be maximized by arranging the antenna elements to match the substrate area 168.

Figure 4:
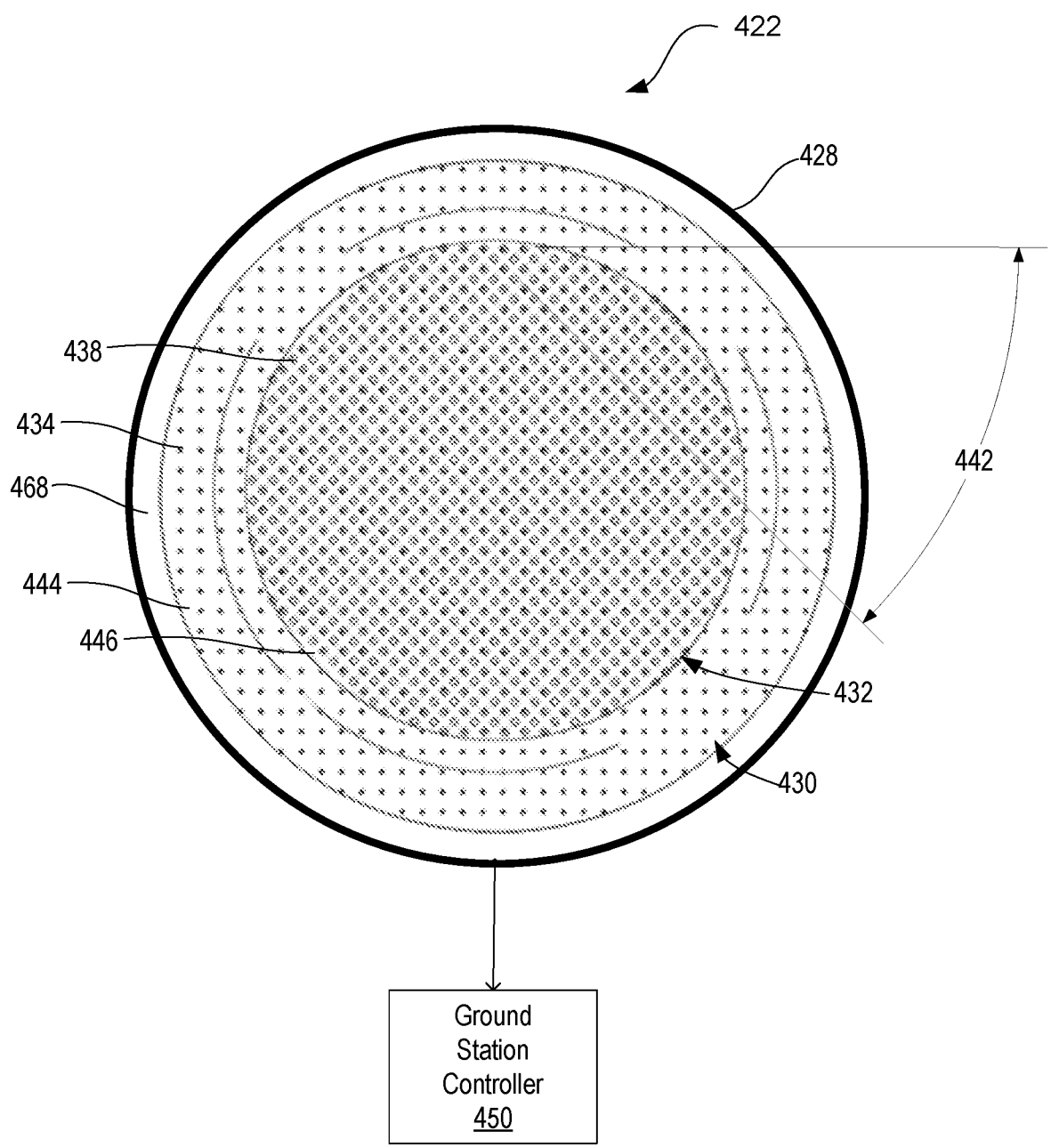
FIG. 4 illustrates a first example of an array layout of an overlapping dual-band phased array antenna, according to embodiments of the present disclosure.

FIG. 4 illustrates a first example of an array layout of a densely packed overlapping dual-band phased array antenna 422, according to embodiments of the present disclosure. The phased array antenna 422 includes an antenna substrate 428 that is substantially circular, and that contains thereon a first antenna array 430, and a second antenna array 432 that is more densely packed than the first antenna array and oriented with a rotational offset with respect to the first antenna array. The antenna substrate 428 can be a printed circuit board like the printed circuit board 148 described above (FIG. 3), onto which the first antenna array 430 and second antenna array 432 can be attached or fabricated. According to some alternative embodiments, the antenna substrate 428 can be a structural panel with which the individual antenna elements of the first antenna array 430 and second antenna array 432 can be connected. The phased array antenna 422 is electrically connected with a ground station controller 450 similar to ground station controller 150 (FIGS. 1-3) that is configured with processing, memory, and executable instructions for controlling the phased array antenna 422.

According to various embodiments, the first antenna array 430 includes transmitting and receiving antennas 434, although antenna elements in the first antenna array that are not also part of the second antenna array 432 may be used exclusively in the receiving function. Alternatively, the first antenna array 430 can include both transmitting and receiving antenna elements as well as receiving antenna elements, the transmitting and receiving antenna elements being present where the first antenna array 430 overlaps with the second antenna array 432, and the receiving antenna elements being present where the first antenna array does not overlap with the second antenna array. The second antenna array 432 includes a combination of both transmitting and receiving antennas 434 as well as transmitting antennas 438. Antenna array elements having a receiving function are denoted as dots, antenna array elements having a transmit function are denoted as circles, and antenna array elements that require both a receiving function in a transmit function are denoted with both. The specific configuration of each individual antenna array element can vary, provided that the antenna array elements making up the first antenna array 430 can receive, in that the antenna array elements making up the second antenna array 420 can transmit. According to some embodiments, all of the antenna array elements in both the first antenna array 430 and second antenna array 432 can be transmitting and receiving antenna elements. However, substituting antenna elements with a transmitting function only within the second antenna array 432 can reduce complexity for the densely packed portion of the phased array antenna 422 and can reduce thermal loading across the densely packed portion.

The individual antenna elements (i.e. transmitting and receiving antennas 434 and transmitting antennas 438) can be arranged in overlapping grids, each having a substantially circular configuration. In a substantially circular configuration, the antenna elements are laid out in a regular grid or lattice with a grid area (e.g. first grid area 144 and second grid area 146) having a circular, elliptical, oval, or comparable boundary within the substrate area 468. According to various embodiments, the first antenna array 430 and second antenna array 432 are each laid out in a regular square grid, the second antenna array 432 being offset from the first antenna array 430 by a rotational offset 142 of between 40° and 50°, preferably about 45°. In some alternative embodiments, the first antenna array 430 and/or the second antenna array 432 may have a compressed (e.g. rectangular) grid configuration, whereby the element spacing in one direction is different than the grid spacing in an orthogonal direction. According to other alternative embodiments, the first antenna array 430 and/or the second antenna array 432 may have a compressed and/or tilted (e.g. trapezoidal) grid configuration, or other suitable lattice configuration.

According to at least one embodiment, the phased array antenna 422 can include at least 900 individual antenna elements including the first antenna array 430 and second antenna array 432. The number of individual antenna elements of the first antenna array 430 can be the same as, or can be different than the number of individual antenna elements corresponding to the second antenna array 432. According to some embodiments, one of the first or second antenna arrays 430, 432, or both, can have an array radius corresponding to at least 15, preferably at least 17 antenna elements, or more. In embodiments where the first antenna array 430 and the second antenna array 432 have the same number of individual antenna elements, the radius of the second antenna array will be smaller than that of the first antenna array due to the denser packing of the individual antenna elements in the second antenna array. An approximate diameter of the second antenna array 432 can be at least 200 mm, preferably about 219 mm. An approximate diameter of the first antenna array 430 can be at least 280 mm, preferably about 299 mm. A margin between the first antenna array 430 in the boundary of the antenna substrate 428 may not be necessary in all cases, however according to at least one embodiment, the antenna substrate may extend beyond the first antenna array 430 by up to 12.5 mm.

For the transmitting case, applicable to the second antenna array 432, antenna performance can be characterized by the antenna is power gain, expressed as decibels (dB) or decibels-isotropic (dBi). The gain describes the efficiency with which the antenna array converts input power into electromagnetic waves in a specified direction, typically the boresight direction. For the receiving case, applicable to the first antenna array 430, the gain describes the efficiency with which the antenna array converts electromagnetic waves from a specified source into electrical power. A phased array antenna 422 configured according to any of the examples described above and with an element gain of 5.4 dBi or higher, can have an array factor of at least 29.5 dB, resulting in an effective gain of the array of at least 33 dBi.

According to some alternative embodiments, the first and second antenna arrays 430, 432 can have different numbers of individual array elements. For example the second antenna array 432, in addition to having denser packing of individual antenna elements, may include a larger number of antenna elements than the first antenna array 430 resulting in a larger radius. In some cases, the second antenna array 432 may occupy the same physical area is the first antenna array, up to the substrate area 168 of the antenna substrate 128, with or without a margin between the second antenna array and the boundary of the antenna substrate.

According to at least one embodiment, the phased array antenna 422 can include at least 2100 individual antenna elements, or approximately 2124 individual antenna elements including the first antenna array 430 and second antenna array 432. The number of individual antenna elements of the first antenna array 430 can be same as, or can be different than the number of individual antenna elements corresponding to the second antenna array 432. According to some embodiments, one or both of the first antenna array 430 or second antenna array 432 can have an array radius corresponding to at least 26 individual antenna elements that radiate from a center of each antenna array. An approximate diameter of the second antenna array 432 can be at least 300 mm, preferably about 321 mm. In approximate diameter of the first antenna array 430 can be at least 400 mm, preferably about 444 mm. A margin between the first antenna array 430 and a boundary of the antenna substrate 428 may extend beyond the first antenna array 430 by up to 12.5 mm. A phased array antenna 422 corresponding to the examples described above and with an element gain of 5.4 DBI or higher, can have an array factor of at least 33.4 dB, resulting in an effective gain of the array of at least 35 DBI, preferably at least 37 dBi.

Phased array antenna 422, or other related phased array antennas described herein, can be expanded to include a greater number of individual antenna elements in either the first antenna array 430 (i.e., low frequency array, or receiving array), the second antenna array 432 (i.e., high-frequency array, or transmitting array), or both. The effective gain of the phased array antenna 422 can generally be increased by increasing the number of individual antenna elements, whether for the receiving or transmitting array, and for applications requiring additional gain, larger phased array antennas can be constructed along the same principles described herein. Although generally described as a receiving antenna array, the first antenna array 430 can also be used as a transmitter; and conversely, the second antenna array 432 can be used as a receiving antenna array. The relative size of the first antenna array 430 and second antenna array 432 can be reversed as well, resulting in a relatively large transmitting array configured for use at high frequency bands, and a relatively small receiving array configured for use at lower frequency bands. The first antenna array 430 and second antenna array 432 may also overlap closely or exactly in area, up to the size of the antenna substrate 428.

Figure 5:
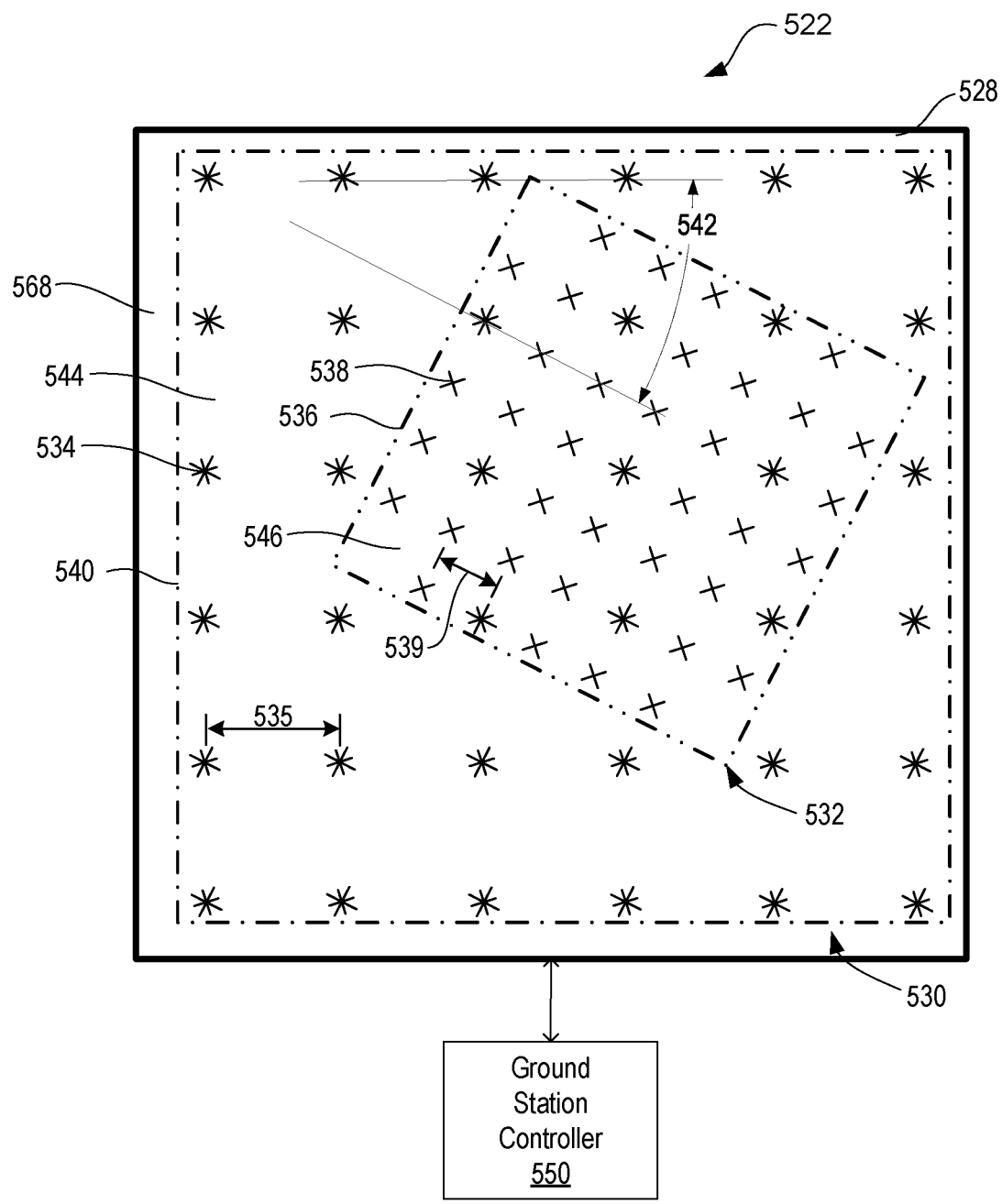
FIG. 5 illustrates a second example of an array layout of an overlapping dual-band phased array antenna, according to embodiments of the present disclosure.

The angle of rotational offset 442 between the first antenna array 430 and second antenna array 432 allows the transmitting antennas 438 of the second antenna array to fit within the first grid 436 defined by the first antenna array 430, and provides for a suitable difference in antenna array element spacing between the first antenna array and the second antenna array, the second antenna array being denser, such that the second antenna array can operate at frequencies that are approximately 50% higher than those at which the first antenna array operates, providing suitable frequency differentiation between the first antenna array 430 and second antenna array 432. However, other angles of rotational offset are available that can provide for different grid spacings in alternative overlapping dual-band phased array antennas, resulting in different possible ranges of frequency differentiation between overlapping antenna arrays. For example, FIG. 5 illustrates a second example of an array layout of an overlapping dual-band phased array antenna 522, according to embodiments of the present disclosure, in which the angle of rotational offset 542 differs from the angle of rotational offset 442 described above.

According to various embodiments, a dual-band phased array antenna 522 can include in antenna substrate 528 containing thereon a first antenna array 530, and a second antenna array 532 that are electrically coupled with a ground station controller 550 through the antenna substrate. The second antenna array 532 can be arranged coplanar with the first antenna array 530. The second antenna array 532 can be nested within a first grid area 544 corresponding to the first antenna array 530. The first antenna array 530 can be formed of a plurality of dual function transmitting and receiving antennas 534 that are arranged in a first grid 536, which can be a square grid, or may have any other suitable lattice shape as described above. The second antenna array 532 includes a subset of the dual function transmitting and receiving antennas 534 of the first antenna array 530, in addition to a plurality of transmitting antennas 538 that are arranged in a second grid 540 that is rotationally offset with respect to the first grid 536 according to an angle of rotational offset 542. According to one embodiment, as shown, a nesting grid pattern can be achieved at an angle of rotational offset 542 of approximately 27°, resulting in a densely packed second antenna array 532 having a second grid spacing 539, and a less densely packed first antenna array 530 having a first grid spacing 535 that is approximately 2.24 times the second grid spacing.

According to various embodiments, the most densely packed antenna array on a given substrate, e.g. the second antenna array 532 on antenna substrate 528, may be limited in how densely the antenna array elements may be packed due to thermal loading or a desired transmitting frequency band. For example, in one embodiment, the second grid spacing 539 may be about 5.2 mm, in which case the first grid spacing 535 may be approximately 11.6 mm, although a wide range of specific grid spacings are available for either the first antenna array 530 or the second antenna array 532. According to various embodiments, the second grid area 546 can be at least partially, or fully contained within the first grid area 544. In some embodiments the second grid 540 can be centered at the same location (i.e. concentric with) the first grid 536, though this need not be the case. When the second antenna array 532 is more densely packed than the first antenna array 530, it may be preferable that the first antenna array occupy a larger area than the first second antenna array in order to achieve comparable gain by including a suitable number of antenna elements. The first antenna array 530 can partially or fully occupy a substrate area of the antenna array delete that 568 of the antenna substrate 528, with or without a margin.

Several advantages arise from the construction of the phased array antennas 122, 422, or 522 having overlaid first and second antenna arrays. For example, microfabrication of multiple antenna arrays on a single antenna substrate 128, 428, 528 substantially reduces manufacturing cost when compared to the fabrication of separate antenna arrays on separate substrates. In addition, fabricating overlaid antenna arrays on the same antenna substrate causes the arrays to have the same physical orientation, thus allowing the control system (e.g., control systems including ground station controllers 150, 450, 550) to correct the scan angle for either one of the antenna arrays based on orientation, geospatial information, or targeting information obtained based on either one of the antenna arrays. Geospatial information refers herein to the location of a ground station, transmitting target, or receiving target, that is on the ground, on the water, or in the air, and may be expressed as coordinates. Satellite path information, similarly, refers herein to the orbital path of a satellite that describes its position over time as it transits through space. Similarly, the initial calibration of the phased array antenna 122, 422, 522, including physical leveling and/or obtaining geospatial information about the phased array antenna, need only be performed once for the combination of arrays rather than separately for each of multiple arrays. When a phased array antenna 122, 422, 522, or other phased arrays described herein, has been leveled and calibrated with geospatial information, a control system of the phased array antenna can predict the relative position of a satellite passing overhead from the geospatial information of the phased array antenna, the satellite path information, and the current time. Obtaining the relative position of a satellite over time allows the phased array antenna to set the scan angle of a receiving antenna array or transmitting antenna array to maximize gain in the direction pointing toward the satellite at any given time, which changes rapidly as a satellite passes overhead.

Advantageously, having both the receiving and transmitting antenna arrays on the same antenna array substrate (e.g., antenna substrate 128, 428, 528) permits the control system to obtain the satellite's relative position once for both transmitting and receiving, as the transmitting antenna array and receiving antenna array share a common aperture, i.e. physical area oriented perpendicular to the direction in which the phased array antenna can transmit and receive signals. Alternatively, the control system of a phased array antenna can "find" a satellite by scanning for a signal from the satellite using a receiving antenna array (e.g., first or receiving antenna arrays 130, 430, 530, or other receiving antenna arrays described here), and iteratively measure signal strength to determine the direction from which the signal from the satellite is received. Again, having both the receiving and transmitting antenna arrays on the same antenna array substrate permits the control system to obtain the satellite's relative position based on scanning once for both transmitting and receiving, as the transmitting antenna array and receiving antenna array share the same location and share a common aperture (i.e., the same aperture). According to some embodiments, the receiving antenna array can be configured to receive a wide beam for downlink, i.e., containing wide beam phased array antenna elements configured to provide for wide angle scanning and/or for receiving a wide beam.

Figure 6:
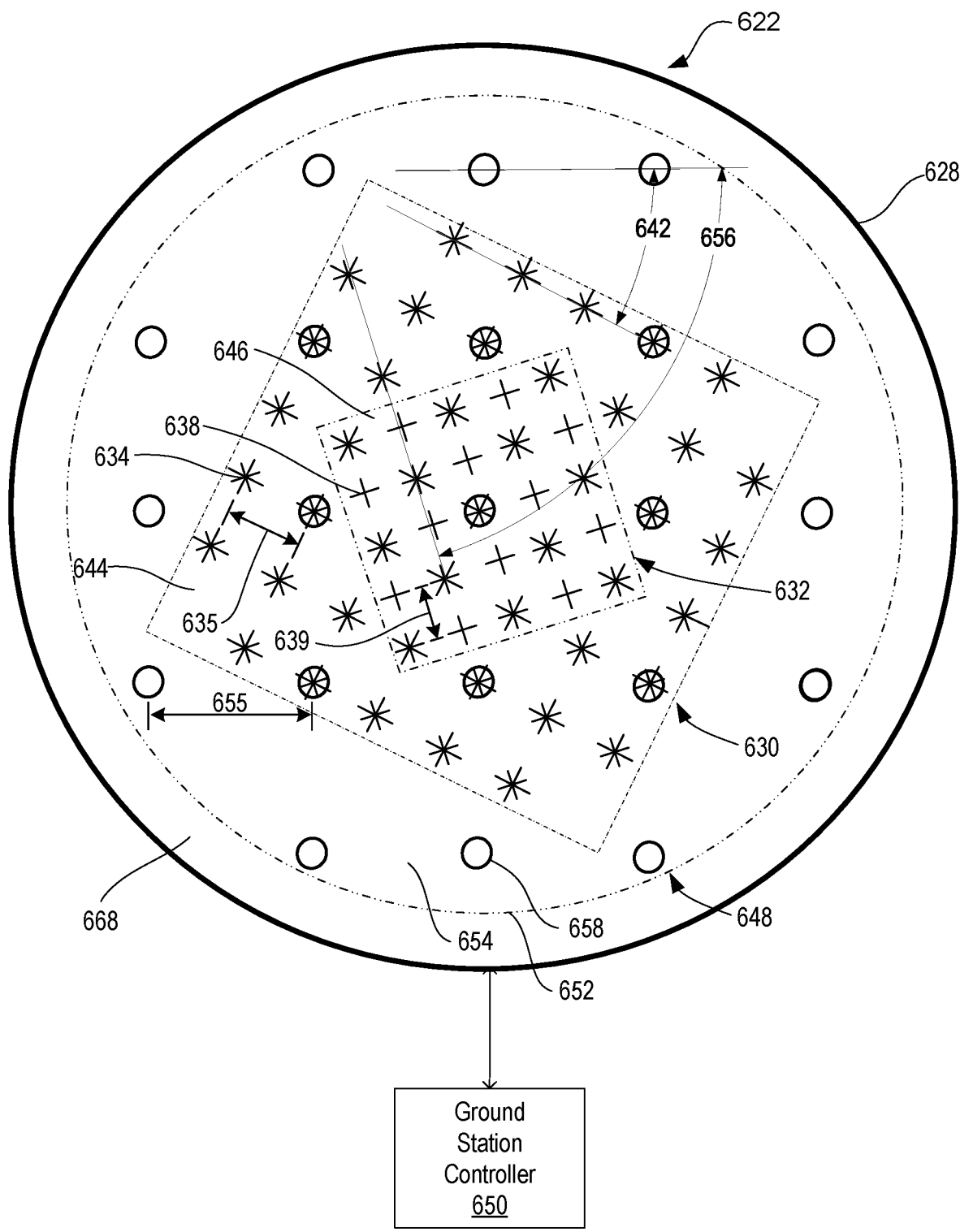
FIG. 6 illustrates an example of an array layout of an overlapping multi-band phased array antenna, according to embodiments of the present disclosure.

According to some alternative embodiments, similar advantages can be obtained in the construction of phased array antennas having multiple overlaid antenna arrays, e.g. first, second, and third antenna arrays oriented at different angles with respect to each other and configured to transmit and/or receive electromagnetic signals in multiple frequency bands. For example, FIG. 6 illustrates an example of an array layout of an overlapping multiband phased array antenna 622, according to embodiments of the present disclosure.

According to various embodiments, the multiband phased array antenna 622 can include an antenna substrate 628 containing thereon a first antenna array 630, a second antenna array 632, and a third antenna array 648, that are electrically coupled with a ground station controller 650 through the antenna substrate. The second antenna array 632 can be coplanar with the first antenna array 630. The second antenna array 632 can be nested within a first grid area 644 corresponding to the first antenna array, independent of whether the first and second antenna arrays are coplanar.

The first antenna array 630 can be formed of a plurality of dual function transmitting and receiving antennas 634 that are arranged in a first grid 636, which can be a square grid, or may have any other suitable lattice shape as described above. The second antenna array 632 includes a subset of the dual function transmitting and receiving antennas 634 of the first antenna array 630, in addition to a plurality of transmitting antennas 638 that are arranged in a second grid 640 that is rotationally offset with respect to the first grid 636. The antenna elements of the first antenna array 630 and the second antenna array 632 are arranged at a 45° offset similar to that described with reference to the first antenna array 130 and second antenna array 132 of the dual-band phased array antenna 122 described with reference to FIGS. 1-3. This rotational offset can result in first grid spacing 635 that is approximately 41% larger than a second grid spacing 639. For example where the second antenna array 632 operates in the range of 27 to 30 GHz, the second grid spacing 639 may be limited (e.g. by thermal loading) to the range of about 5 to 6 millimeters, preferably about 5.66 mm, resulting in the first antenna array 630 having a first grid spacing 635 in the range of about 7.5 mm to 8.5 mm, preferably about 7.98 mm.

According to at least one embodiment, the first antenna array 630 and the second antenna array 632 can be nested within a third grid 652 corresponding to the third antenna array 648. The third antenna array 648 can include a third set of transmitting and/or receiving antennas 658 that occupy a third grid area 654 within the substrate area 668. The third grid area 654 can be larger than the second grid area 646 which can be larger than the second grid area 646.

In order to nest multiple antenna arrays on the same antenna substrate 628, each nested antenna array can be positioned on the antenna substrate at respectively increasing angles of rotational offset with respect to the largest antenna array. For example, as shown in FIG. 6, taking the third antenna array 648 as reference, the first antenna array 630 can be offset by a first angle of rotational offset 642 of approximately 27°, resulting in the first antenna array 530 being significantly more dense then the third antenna array, the third grid spacing 655 being approximately 2.24 times the first grid spacing. For example, where the first antenna array 630 has a first grid spacing 635 in the range of about 7.5 mm to 8.5 mm, preferably about 7.98 mm, the third grid spacing 655 may be about 17.5 mm to 18.5 mm, about 17.9 mm. Similarly, the second antenna array 632 can be offset with respect to the third antenna array 648 by a second angle of rotational offset 656 equal to the sum of the first rotational offset and the rotational offset between the first and second antenna arrays, e.g. about 72° as shown. However, the first angle of rotational offset 642 could be any other suitable angle that can generate a nested grid, and use of other angles of rotational offset will result in alternative grid spacings, which are suitable to transmit and/or receive in different frequency bands. In addition, the specific angles of rotational offset between each successively nested antenna array can be selected in order to accommodate a series of desired transmitting and/or receiving frequency bands.

Figure 7:
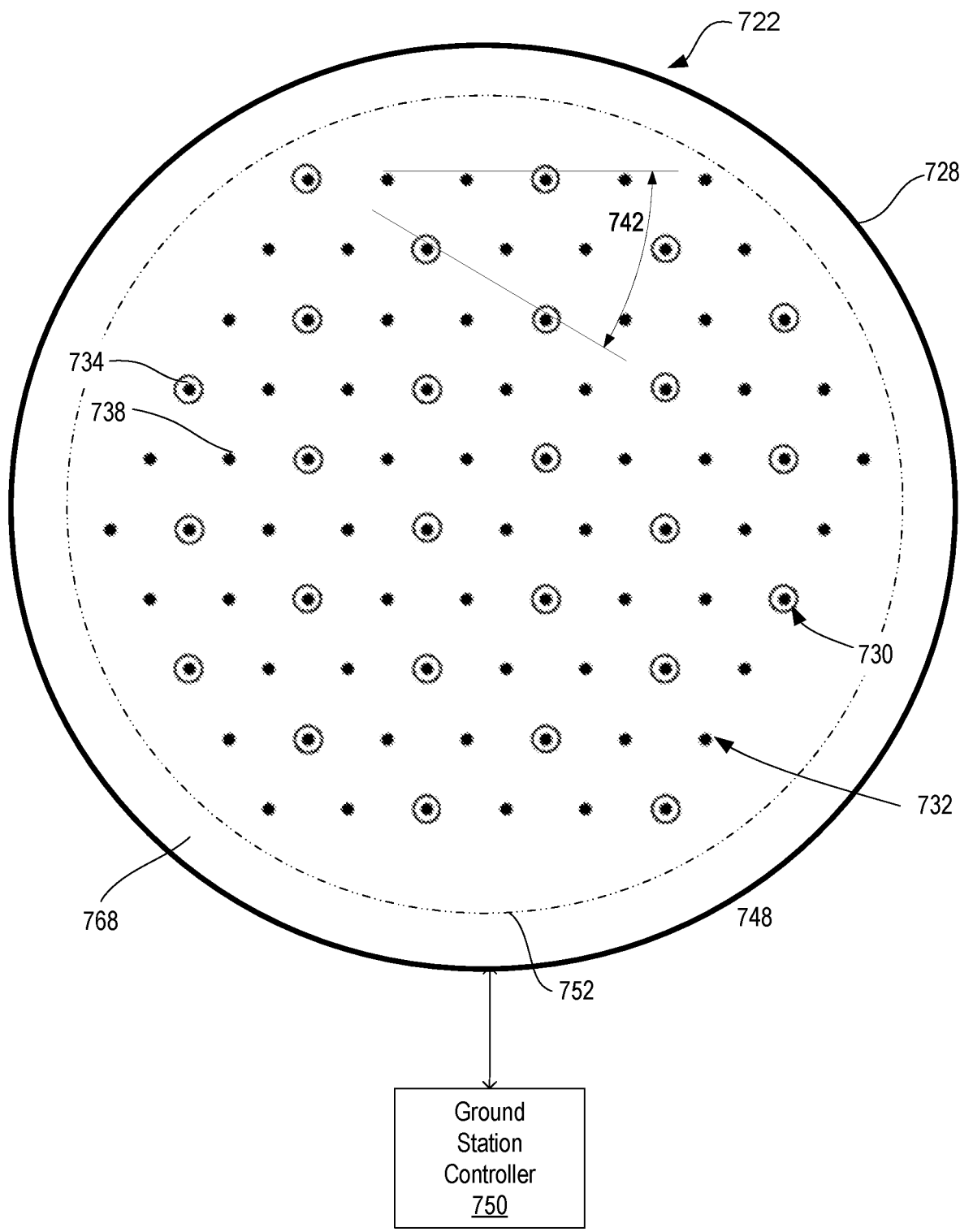
FIG. 7 illustrates an example of an array layout of a dual-band phased array antenna having a non-rectangular, non-square arrangement of antennas, according to embodiments of the present disclosure.

According to some alternative embodiments, phased array antennas having two or more overlaid antenna arrays, where one or both of the overlaid antenna arrays do not have square or rectangular grid shapes, and where the antenna arrays are oriented at different angles with respect to each other and configured to transmit and/or receive electromagnetic signals in different frequency bands. For example, FIG. 7 illustrates an example of an array layout of an overlapping dual band phased array antenna 722, according to embodiments of the present disclosure.

According to various embodiments, the dual band phased array antenna 722 can include an antenna substrate 728 containing thereon a first antenna array 730, and a second antenna array 732, that are electrically coupled with a ground station controller 750 through the antenna substrate. The second antenna array 732 can be coplanar with the first antenna array 730 and the individual antennas 738 of the second antenna array can be nested between the antennas 734 of the first antenna array.

The first antenna array 730 can be formed of a plurality of dual function transmitting and receiving antennas 734 that are arranged in a triangular lattice pattern. The second antenna array 732 includes a subset of the dual function transmitting and receiving antennas 734 of the first antenna array 730, in addition to a plurality of transmitting antennas 738 that are arranged nested between the transmitting and receiving antennas 734 in a triangular lattice pattern that is rotationally offset with respect to the first grid 736. The antenna elements of the first antenna array 730 and the second antenna array 732 can be arranged at a 30° offset 742, for the case where the triangular array is evenly spaced; though like rectangular arrays, triangular arrays can also be altered in one or more dimensions. This rotational offset 742 results in disparate array densities of the first antenna array 130 and second antenna array 132, where the disparate array densities cause each antenna array to have a different optimal frequency (for transmitting or receiving) that depends on the spacing between individual antennas of each array. In the example dual band phased array antenna 722, the frequency range for the second antenna array 732 will be approximately 1.73 times the frequency range for the first antenna array 730, with the exact frequency ranges of each dependent upon the exact antenna spacing.

Embodiments of phased array antennas described herein with reference to FIGS. 1-7, above, include nested first antenna arrays and second antenna arrays, which may coplanar, and which may be assigned respective data receiving and data transmitting functions. For example, according to various embodiments, among nested pairs of antenna arrays, the array having a larger physical area and grid spacing is typically a receiving array configured to receive data transmission. The array having a smaller physical area and denser grid spacing is typically a transmitting array configured to transmit data to a target, e.g. a satellite, aircraft, other ground station, or other suitable transmission target. The assigned functions of respective first antenna arrays and second antenna arrays can be reversed, e.g. the first antenna arrays configured to transmit and the second antenna arrays configured to receive data transmissions. Examples illustrating the operation phased array antenna to transmit and receive data to and from satellites in a satellite network are described below with reference to FIGS. 8-10

Various methods for implementing the approaches to transmitting and receiving data via a dual-band/or multiband phased array antenna as described above are described in detail below with reference to FIGS. 8 and 9. Some or all of process 800 and 900 described below (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In various embodiments, the processes 800 and 900, or combinations thereof may be carried out by, e.g., a local controller such as ground station controller 150 (FIG. 1) or any other ground station controller described herein, by distributed controllers co-located with signal processing hardware on or within a phased array antenna, by a network accessible remote controller that communicates with a local ground station controller via a network, or by a combination of the above.

Figure 8:
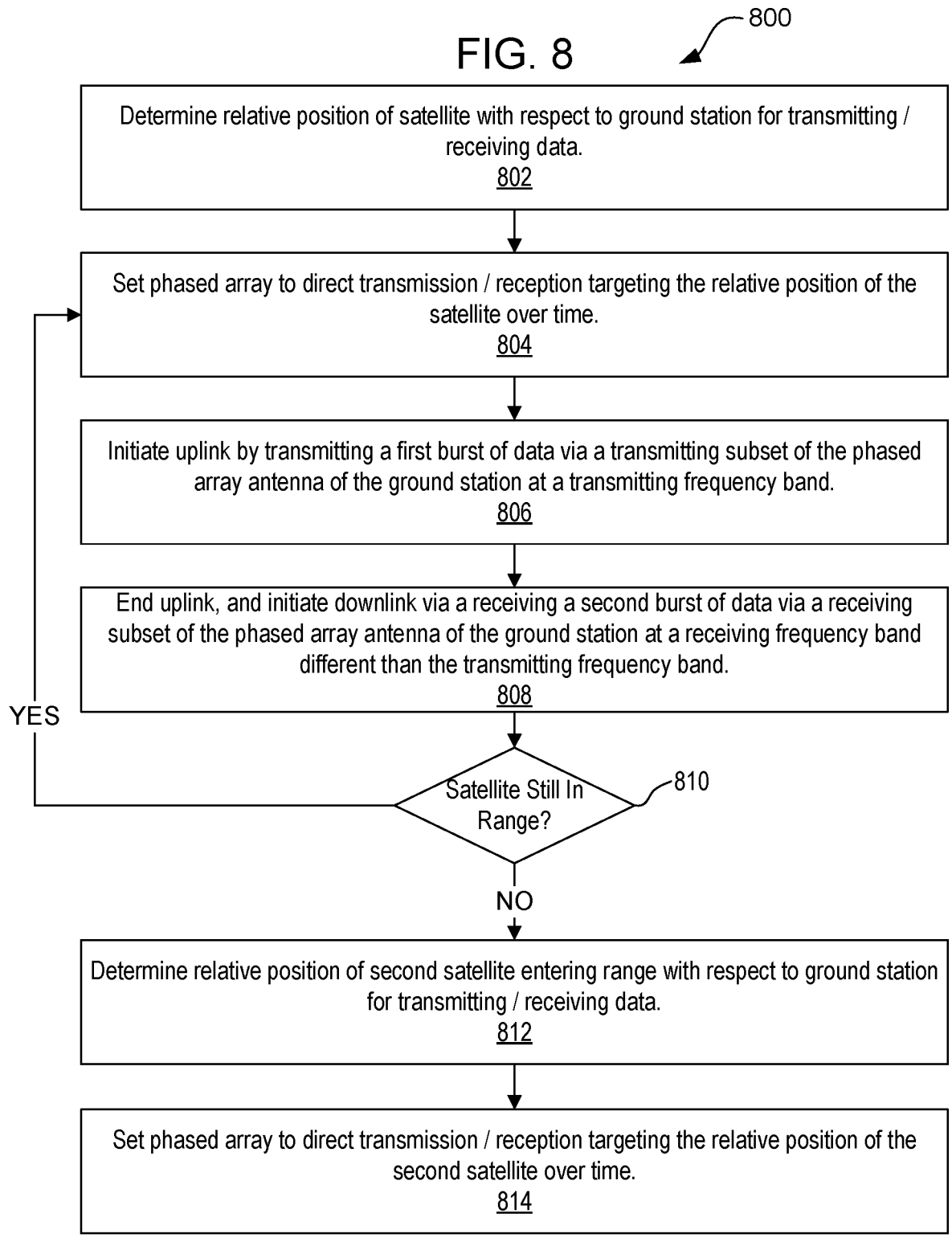
FIG. 8 illustrates a first example of a process flow for orienting, transmitting, and receiving data by a ground station to and from a satellite, according to embodiments of the present disclosure.

FIG. 8 illustrates an example of a first process 800 for orienting, transmitting, and receiving data by a ground station to and from a satellite, according to embodiments of the present disclosure. First, the system can determine a relative position of satellite or other suitable transmission target with respect to the ground station for the purpose of transmitting and/or receiving data to or from the satellite. (Act 802). This locating step can be achieved by, for example, direct methods such as scanning for a signal from a satellite entering the range of the ground station. The locating step can be achieved by, for example, predicting the timing and direction of a satellite entering the range of the ground station based on geolocation information of the ground station and predetermined path information of the satellite indicative of the timing and relative location at which the satellite will enter the range of the ground station.

When the relative position of the satellite or other suitable transmission target has been determined, the system can then set one or both of the transmitting elements of the phased array antenna and the receiving elements of the phased array antenna to transmit or to receive transmissions from the relative position of a satellite. (Act 804). In the case of the receiving elements, a receiving antenna array of the ground station is configured with instructions to scan from an initial position of the satellite across an arc corresponding to the path of the satellite for a period of time during which the satellite is in range. Scanning along the path of the satellite maximizes the gain of the receiving antenna array in the direction of the satellite for the duration of the window of time during which the satellite is in range of the ground station. In the case of the transmitting elements, a transmitting antenna array of the ground station that is nested with the receiving antenna array, and that includes some antenna elements of the receiving antenna array, is configured with instructions to scan from an initial position of the satellite across the arc corresponding to the path of the satellite. In the transmitting case, scanning along the path of the satellite maximizes the transmitting gain of the ground station in the direction of the satellite during the same window of time.

Because some of the antenna array elements are shared between the transmitting portion of the phased array antenna and the receiving portion of the phased array antenna, improved signal resolution can be achieved by time division duplexing (TDD) between uplink and downlink. For example, the system can initiate an uplink by transmitting a first burst of data via a transmitting subset of the phased array antennas of the ground station at a transmitting frequency band. (Act 806). Subsequently, the system can end the uplink, and initiate a downlink by scanning to receive a second burst of data via a receiving subset of the phased array antenna at a receiving frequency band that is different from the transmitting frequency band. (Act 808). Signals received at the shared subset of antenna array elements can be de-convoluted from signals transmitted by that subset via time division duplexing (TDD), frequency division duplexing (FDD), or a combination of both, in order to prevent packet loss or to correct for any bleed between uplink and downlink.

The system can change the scanning direction of the transmitting and/or receiving elements of the phased array antenna by modulating the phase of the signal transmitted by individual antennas in the phased array antenna to track the satellite from the time that it enters the range of the phased array antenna for as long as the satellite remains within the cone the can be scanned by the phased array antenna. (Act 810). This scanning maximizes the gain of the transmitting antenna array and the receiving antenna array in the direction of the satellite. According to some embodiments, the system can correct the scanning direction over time based on signals received from the satellite, e.g., using the receiving antenna array to scan across an arc containing the instantaneous position of the satellite to identify the location at which gain is maximized, and then using the identified location to correct the scanning direction for transmitting signals by the transmitting antenna array. According to some alternative embodiments, the system can receive satellite location information by other means, e.g. via a network, and use the received satellite location information in conjunction with geolocation information of the ground station to determine the scanning direction for the receiving antenna array, for the transmitting antenna array, or for both.

The system can determine that the satellite is approaching or has reached a boundary of the effective range of the ground station based on, for example, the scanning direction of the receiving antenna array or transmitting antenna array approaching a maximum scan angle, the duration of the datalink approaching a known limit, or based on received data from the satellite or via a network. When the system detects that the satellite is no longer in range, (act 812,) the system can determine a relative position of a second satellite entering its effective range with respect to the ground station for transmitting and/or receiving data according to any suitable method as described above with reference to the identification of the first satellite. (Act 812).

According to some embodiments, the system can terminate the datalink between the first satellite and the ground station upon detecting that the satellite is no longer in range or prior to detecting that the satellite is no longer in range. Alternatively the datalink can be terminated automatically when the first satellite exits the effective range of the ground station, or at a predetermined time prior to the first satellite exiting the effective range. Once the second satellite is detected, and/or once the first satellite has exited the range of the ground station, the system can set the phased array antenna to direct transmissions and to receive transmissions from the relative position of the second satellite over time. (Act 814). According to various embodiments, there may be some gap in time between the first satellite exiting the range of the ground station and the second satellite entering the range of the ground station, in which case the ground station may reconfigure to initiate a datalink with the second satellite prior to the entry of the second satellite into the effective range of the ground station.

Figure 9:
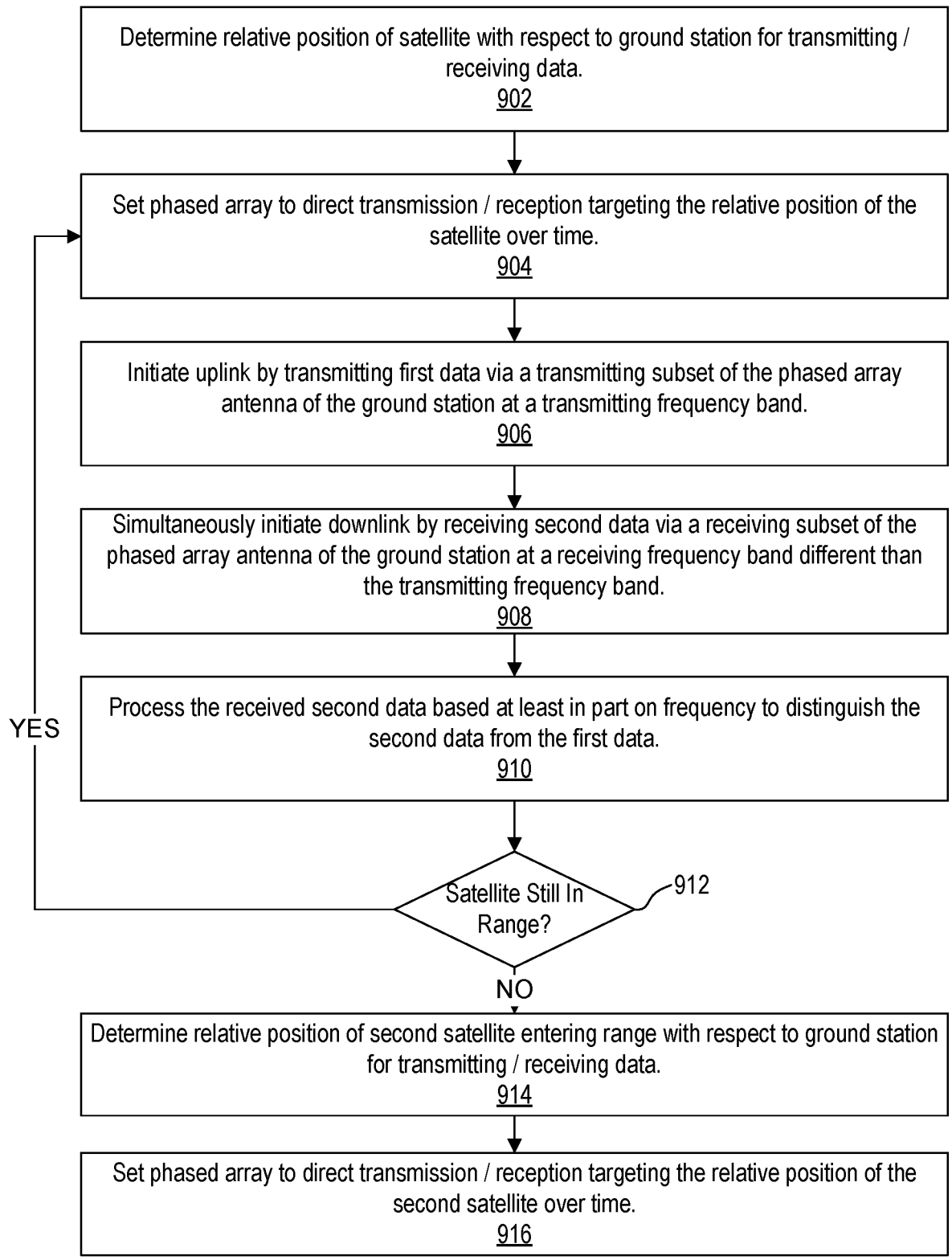
FIG. 9 illustrates a second example of a process flow for orienting, transmitting, and receiving data by a ground station to and from a satellite, according to embodiments of the present disclosure.

FIG. 9 illustrates an example of a second process flow 900 for orienting, transmitting, and receiving data by a ground station to and from a satellite, according to embodiments of the present disclosure. First, the system can determine a relative position of a satellite (or other suitable transmission target) with respect to the ground station for transmitting and/or receiving data. (Act 902). Locating the satellite can be achieved by direct methods, e.g. scanning for a signal, or by predictive methods using known information concerning the geolocation information of the ground station, predetermined path information of the satellite, or specific instructions received as input by the user or transmitted via a network.

When the relative position of the satellite or other transmission target has been determined, the system can then set one or both of the transmitting elements of the phased array antenna or the receiving elements of the phased array antenna to transmit toward or to receive transmissions from the satellite over time. (Act 904). In the case of the receiving elements, a receiving antenna array of the ground station is configured with instructions to scan from an initial position of the satellite across an arc corresponding to the path of the satellite for a period of time during which the satellite is in range. Scanning along the path of the satellite maximizes the gain of the receiving antenna array in the direction of the satellite for the duration of the window of time during which the satellite is in range of the ground station. In the case of the transmitting elements, a transmitting antenna array of the ground station that is nested with the receiving antenna array, and that includes some antenna elements of the receiving antenna array, is configured with instructions to also scan from an initial position of the satellite across the arc corresponding to the path of the satellite. In the transmitting case, scanning along the path of the satellite maximizes the transmitting gain of the ground station in the direction of the satellite during the same window of time.

Next, the system can initiate an uplink by transmitting data packets using the transmitting elements of the phased array antenna, targeting the satellite (or other suitable transmission target), using a transmitting frequency band corresponding to the transmitting elements. (Act 906). Because some of the antenna array elements are shared between the transmitting portion of the phased array antenna and the receiving portion of the phased array antenna, signals received by the receiving antenna array can be influenced by signals transmitted by the transmitting antenna array, though the shared antenna array elements contribute nonetheless to improved transmission gain for the uplink, and to improved reception gain for the downlink.

The system can simultaneously initiate a downlink by receiving second data using the receiving elements (or transmitting/receiving elements) of the phased array antenna (Act 908). The receiving step can include scanning across an arc using the receiving antenna array to determine a direction from which the signal strength from the satellite is maximized, which corresponds to an instantaneous location of the satellite. The receiving step can further include receiving data packets by the receiving antenna array from the satellite while simultaneously transmitting data packets by the transmitting antenna array. Simultaneous data transmission and receipt via the antenna array elements that are shared between the transmitting antenna array and receiving antenna array may cause some signal bleed of the transmitted signal into at least the received signal. The system can, however, process the received first data and/or the received second data based in part on the respective uplink and downlink frequencies in order to de-convolute the first data from the second data via frequency division duplexing. (Act 910).

The system can change the scanning direction of the transmitting and/or receiving elements of the phased array antenna by modulating the phase of the individual antennas in the phased array antenna to track the satellite from the time that it enters the range of the phased array antenna for as long as the satellite remains within the cone the can be scanned by the phased array antenna. (Act 912). According to some embodiments, the system can correct the scanning direction over time based on signals received from the satellite, e.g., using the receiving antenna array to scan across an arc containing the instantaneous position of the satellite to identify the location at which gain is maximized, and then using the identified location to correct the scanning direction for transmitting signals by the transmitting antenna array. According to some alternative embodiments, the system can receive satellite location information by other means, e.g. via a network, and use the received satellite location information in conjunction with geolocation information of the ground station to determine the scanning direction for the receiving antenna array, for the transmitting antenna array, or for both.

The system can determine that the satellite is approaching or has reached a boundary of the effective range of the ground station based on, for example, the scanning direction of the receiving antenna array or transmitting antenna array approaching a maximum scan angle, the duration of the datalink approaching a known limit, a received command, or based on received data from the satellite or via a network. When the system detects that the satellite is no longer in range, (act 912,) the system can determine a relative position of a second satellite entering its effective range with respect to the ground station for transmitting and/or receiving data according to any suitable method as described above with reference to the identification of the first satellite. (Act 914).

According to some embodiments, the system can terminate the datalink between the first satellite and the ground station upon detecting that the satellite is no longer in range or prior to detecting that the satellite is no longer in range. Alternatively the datalink can be terminated automatically when the first satellite exits the effective range of the ground station, or at a predetermined time prior to the first satellite exiting the effective range. Once the second satellite is detected, the system can set the phased array antenna to direct transmissions and to receive transmissions from the relative position of the second satellite. (Act 916). According to various embodiments, there may be some gap in time between the first satellite exiting the range of the ground station and the second satellite entering the range of the ground station, in which case the ground station may reconfigure to initiate a datalink with the second satellite prior to the entry of the second satellite into the effective range of the ground station, and then hold until the second satellite is detected.

Aspects of processes 800 and 900, or other processes described herein, can be applied for communications by a dual-band/or multiband phased array antenna with any suitable communication target, e.g., for communication between ground stations, for communication between a ground station and an aircraft, vessel, or vehicle, or for communication between aircraft, vessels, or vehicles. In addition, satellite communications systems can include dual-band/or multi-band phased array antennas having similar construction to the phased array antennas described herein, thus satellite communications systems can operate in the same manner as the ground station communication systems described above.

Figure 10:
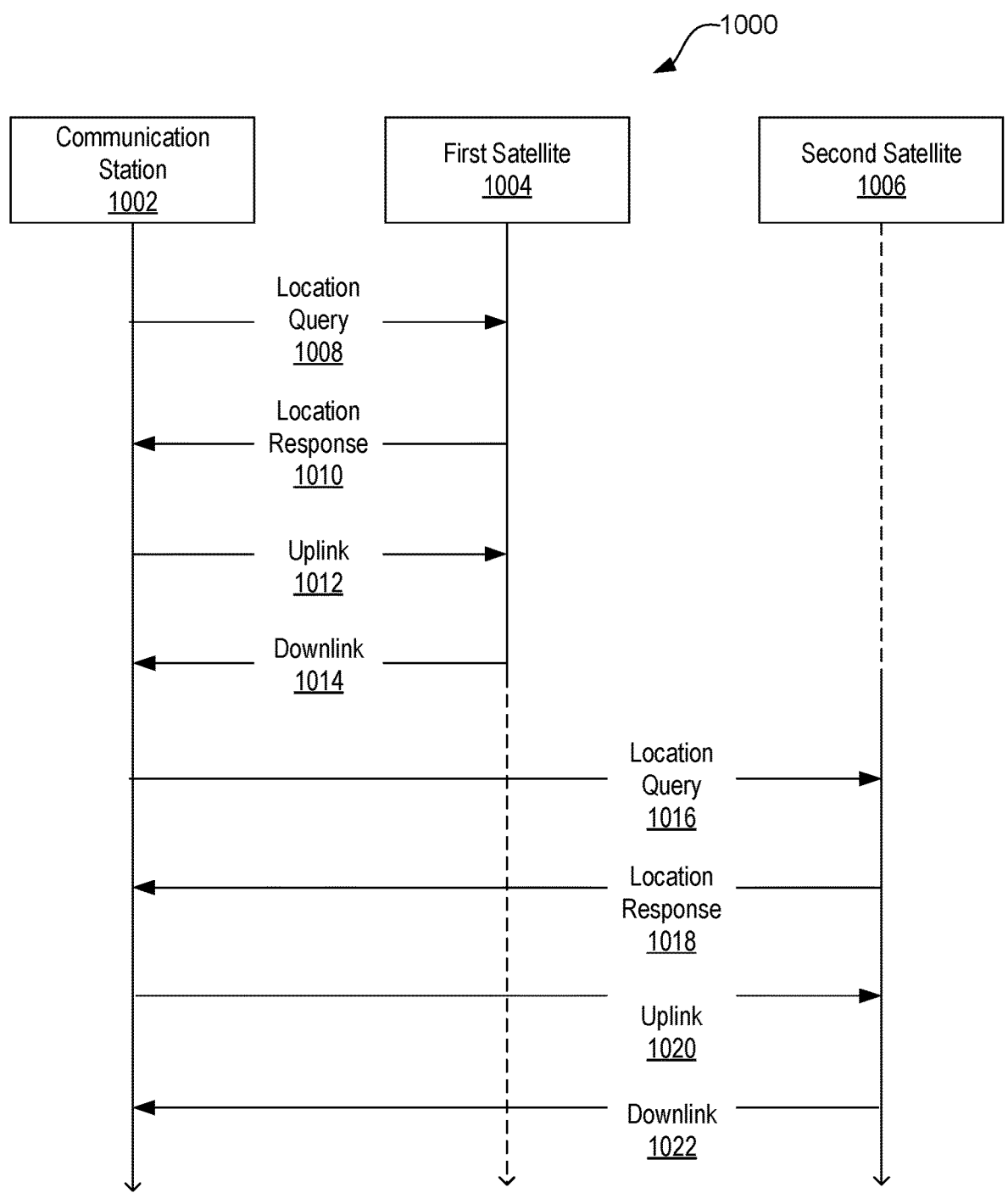
FIG. 10 illustrates an example of a transmit/receive process whereby data is transmitted and received between a satellite and a ground station, according to embodiments of the present disclosure.

FIG. 10 illustrates an example of a transmit/receive process 1000 whereby data packets are transmitted and received between a communication station 1002 (which can be a ground station), a first satellite 1004, and a second satellite 1006 that are representative of a satellite network, according to embodiments of the present disclosure. According to some embodiments, the communication station 1002 can open a datalink with the first satellite 1004 by sending a first data packet containing, for example, a location query 1008 configured to cause the first satellite to relay location information, and/or a confirmation signal or digital handshake. The first satellite 1004, after receipt and processing of the location query 1008, can respond by sending a data packet containing a location response 1010 that confirms receipt of the location query and/or the initiation of the datalink between the first satellite in the communication station 1002.

Transmissions sent by the communication station 1002 can be sent at a communication station transmitting frequency band, and transmissions sent by the first satellite 1004 can be sent at the communication stations receiving frequency band, the transmitting frequency band and receiving frequency band being different, with the transmitting frequency band typically being higher than the receiving frequency band. For example the transmitting frequency band can be on the order of 27 to 30 GHz, and the receiving frequency band on the order of 17 to 20 GHz. The transmitting frequency band corresponds to a densely packed subset of the antenna elements that form a transmitting antenna array, and the receiving frequency band corresponds to a less densely packed subset of the antenna elements that form a receiving antenna array, the transmitting and receiving antenna arrays being arranged as an overlapping dual-band phased array antenna according to any of the embodiments described above with reference to FIGS. 1-7.

According to some embodiments, the first satellite 1004 can initiate the datalink with the communication station 1002 by sending the location query 1008, in which case the communication station can respond by sending the location response 1010. The communication station 1002 can use the location response 1010 to determine a position of the first satellite 1004 with respect to the communication station, in order to determine an optimal direction by which to steer the transmission beam when sending subsequent data packets, and similarly the first satellite can use the location query 1008 to calibrate the optimal direction by which the satellite will communicate subsequent data packets to the communication station 1002.

When the datalink has been established between the communication station 1002 and the first satellite 1004, the communication station 1002 can initiate an uplink 1012 whereby a data transmitting array (e.g., the second antenna array 132, FIG. 1, or other second antenna array described herein) transmits data packets to the first satellite. Likewise, the first satellite 1004 can initiate a downlink 1014 to the communication station 1002, whereby transmitting hardware of the first satellite 1004 transmits data packets for receipt by the communication station 1002 via a data receiving array (e.g. the first antenna array 130, for one, or other first antenna array described herein). According to various embodiments, the communication station 1002 and the first satellite 1004 can alternate between sending data to the first satellite 1004 (uplink 1012), and receiving data from the first satellite downlink 1014 according to a predefined uplink and downlink pattern.

The uplink and downlink pattern can include alternating periods of uplink that have the same duration as alternating periods of downlink. Alternatively, the uplink and downlink pattern can include alternating periods of uplink that are longer than or shorter than the alternating periods of downlink. According to some alternative embodiments, the uplink 1012 and downlink 1014 can be simultaneous, and the uplink and downlink signals can be distinguished by the communication station 1002 based on, e.g., utilizing frequency division duplexing applied to signals sent and received by antenna elements shared by the transmitting and receiving antenna arrays.

The datalink between the communication station 1002 and the first satellite 1004 can persist for as long as the first satellite is within range of the communication station, i.e., within the scanning arc available to the communication station. In a satellite communication system, any given satellite can be in range of the scanning arc of a phased array antenna for a fairly short period of time. Satellites in low Earth orbit, for example, typically complete a revolution around the earth in about 90 minutes, thus any one satellite in low Earth orbit may have line of sight to a communication station for only a few minutes. Thus both the communication station 1002 and the first satellite 1004 can continuously adjust the angle at which they transmit data packets to each other for the duration of the datalink.

When the first satellite 1004 approaches the range of the scanning arc available to the communication station 1002, the communication station 1002 can scan to identify a second satellite 1006 coming within range, and can initiate a new datalink with the second satellite 1006. The communication station 1002 may also sever the first datalink with the first satellite 1004, or alternatively, the duration of the first datalink may be established upon inception and may terminate automatically. The communication station 1002 can establish the second datalink by sending a second location query 1016 configured to cause the second satellite to relay location information and/or a confirmation signal or digital handshake. The second satellite 1006 may respond, after receipt and processing of the second location query 1016, by sending a data packet containing a location response 1018 that confirms receipt of the location query and/or confirms initiation of the second datalink between the second satellite and the communication station 1002.

As described above, according to some embodiments, the second satellite 1006 can initiate the datalink with the communication station 1002 by sending the second location query 1016 in which case the communication station 1002 can respond with the location response 1018. The second satellite 1006 and the communication station 1002 can communicate in the same manner using a datalink as described between the communication station and the first satellite 1004. For example, the communication station 1002 can alternatingly send data via an uplink 1020 to the second satellite 1006, and receive data via a downlink 1022 from the second satellite. Alternatively, the communication station 1002 and the second satellite 1006 can simultaneously establish the uplink 1020 and downlink 1022, and the communication station can de-convolute signals received by antenna array elements shared by the transmitting and receiving antenna arrays via, e.g., frequency division duplexing.

Embodiments of phased array antennas described herein with reference to FIGS. 1-7, above, include nested and coplanar dual-band/or multiband phased array antennas including at least first antenna arrays and second antenna arrays that are described primarily for use in communications using separated frequency bands for uplink and downlink functions. However, nested dual-band and multiband phased array antennas can be used for other purposes. For example, in some embodiments, both a first and second antenna array can be configured for listening on the different bands rather than transmitting, or both the first and second antenna arrays can be configured for transmitting on the different bands. Alternatively, a dual-band phased array antenna can be used for separate functions entirely using the same structure. For example, according to some embodiments, one of the first or second antenna arrays may be used for communications by, e.g., a satellite, aircraft, vessel, vehicle, or ground station, while the other of the antenna arrays can be used for sensing or detection (e.g., as a radar antenna for aircraft, weather sensing radar for a satellite, or comparable sensor). The overlaid structure of first and second antennas on a common substrate can allow for the combination of sensing and communications capability into common hardware, thus providing for reductions in cost and complexity for a variety of applications.

Figure 11:
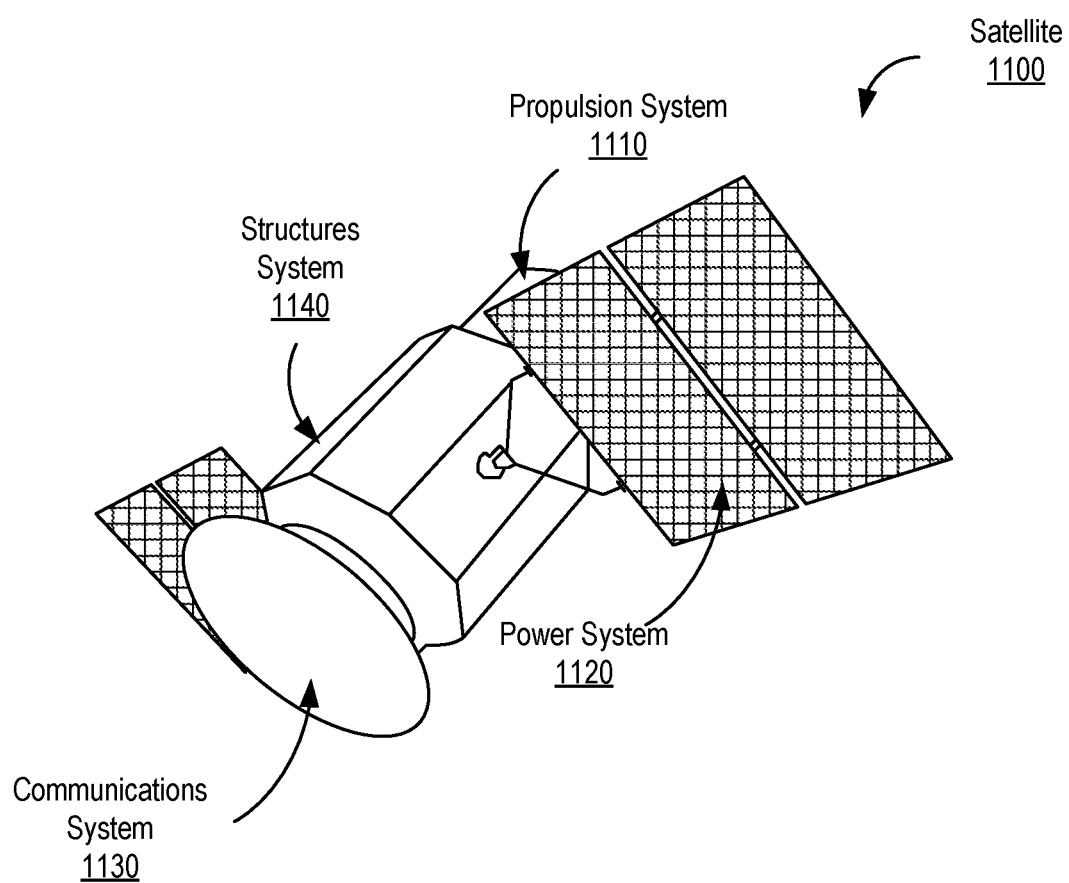
FIG. 11 illustrates an example of components of a satellite, according to embodiments of the present disclosure.

FIG. 11 illustrates an example of components of a satellite 1100, according to embodiments of the present disclosure. The satellite 1100 is an example of the satellite 112 of FIG. 1. As illustrated, the satellite 1100 includes, among other components, a propulsion system 1110, a power system 1120, a communications system 1130, and a structures system 1140.

In an example, the propulsion system 1110 includes one or more motors (e.g., rocket motors) that may move the satellite 1100 in a position within an orbit. The propulsion system 1110 also includes as thrusters to maintain the satellite 1100 in its position. The thrusters can also be used to move the satellite 1100 back into position in the orbit due to, for instance, solar wind or gravitational or magnetic forces.

In an example, the power system 1120 generates electricity from the solar panels deployed on the outside of the satellite 1100. The solar panels also store electricity in a set of storage batteries installed within the structures system 1140. The set of storage batteries can provide power at times when the panels do not receive rays from the sun. The power is used to operate various systems of the satellite 1100, including the communications system 1130.

In an example, the communications system 1130 handles receive and transmit functions. The communications system 1130 receives signals from a source, amplifies them, and transmits them to a destination. The source can be user equipment on the Earth or another satellite. The destination is typically different from the source and includes user equipment on the Earth or another satellite.

In an example, the structures system 1140 provides a stable set of structures so that the satellite 1100 can be kept in position. The structures system 1140 can also house components of other systems, such as subsystems of the power system 1120 (e.g., the storage batteries, power converters, and the like) and subsystems of the communications system 1130 (e.g., receivers, transmitters, and the like). Other components can also be housed within the structures system 1140. For instance, a thermal control system is contained in the structures system 1140. The thermal control system keeps components of the satellite 1100 within their operational temperature ranges. A control system is also contained in the structures system 1140. The control system orients the satellite 1100 precisely to maintain the proper position. When the satellite gets out of position, the control system instructs the propulsion system 1110 to control one or more thrusters to move the satellite 1100 back in position. The control system also includes tracking, telemetry, and control subsystems for monitoring vital operating parameters of the satellite 1100, telemetry circuits for relaying this information to user equipment on the Earth, a system for receiving and interpreting commands sent to the satellite 1100 from the user equipment or another satellite, and a command system for controlling the operation of the satellite 1100.

Figure 12:
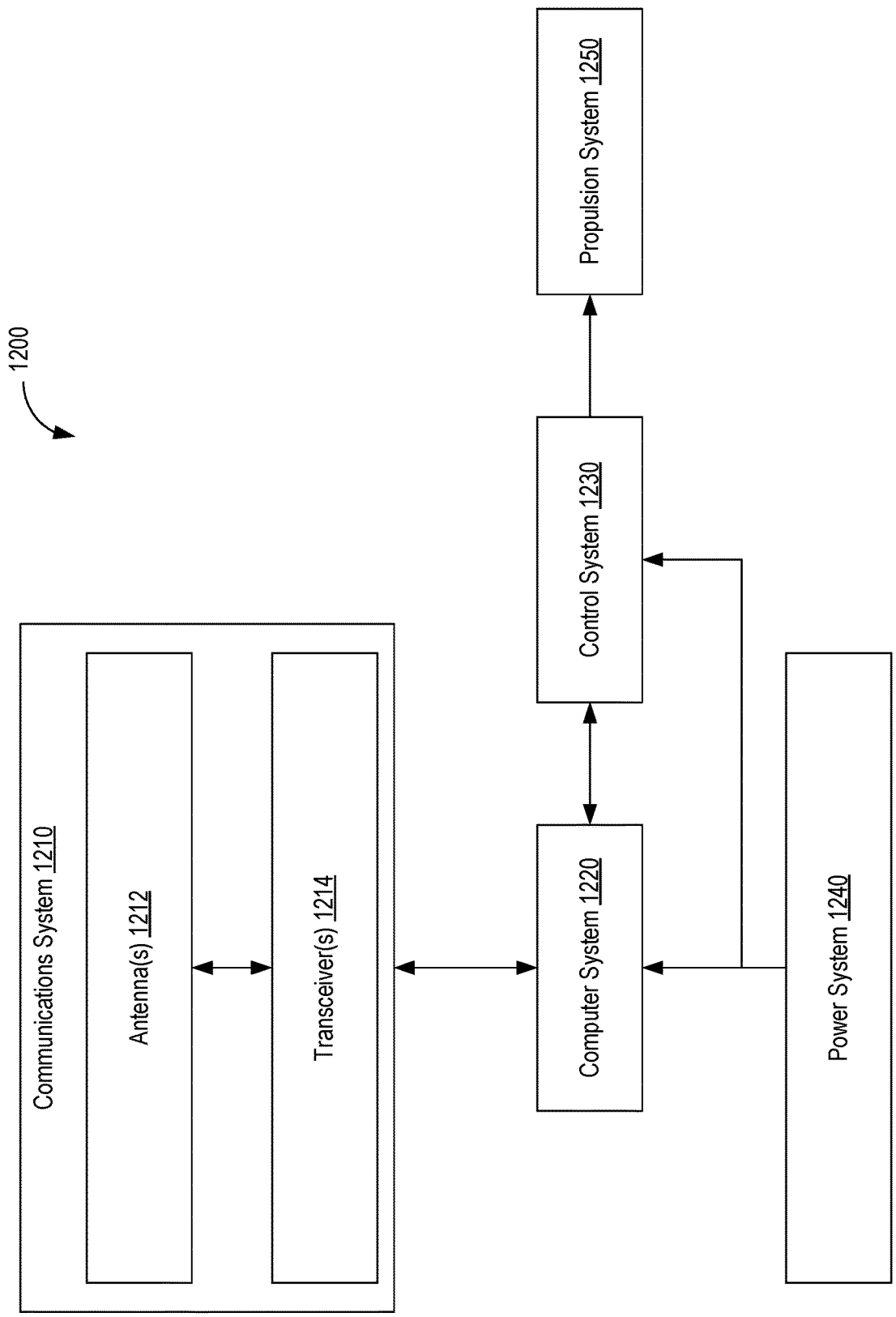
FIG. 12 illustrates an example of components of a computer system that can belong to a satellite, according to embodiments of the present disclosure.

FIG. 12 illustrates an example of components of systems 1200 of a satellite, according to embodiments of the present disclosure. The satellite can be any of the satellites described herein above in connection with FIGS. 1-10. As illustrated, the systems 1200 include a communications system 1210, a computer system 1220, a control system 1230, a power system 1240, and a propulsion system 1250.

In an example, the communications system 1210 provides communications with other satellites and/or user equipment such as ground stations. The communications system 1210 can include a set of antennas 1212 and a set of transceivers 1214. The set of antennas 1212 supports radio frequencies within a desired frequency spectrum and can be a phased area of antenna elements. The transceivers 1214 can be components of a transponder of the satellite and can include a set of satellite receivers and a set of satellite transmitters. The satellite transmitter(s) may, for example, multiplex, encode, and compress data to be transmitted, then modulate the data to a desired radio frequency and amplify it for transmission over the set of antennas 1212. Multiple channels can be used, in addition to error correction coding. The satellite receiver(s) demodulates received signals and performs any necessary de-multiplexing, decoding, decompressing, error correction and formatting of the signals from set of antennas 1212, for use by the computer system 1220. The set of antennas 1212 and/or the set of transceivers 1214 may also include switches, filters, low-noise amplifiers, down converters (for example, to an intermediate frequency and/or baseband), and/or other communications components. Data decoded by the satellite receiver(s) can be output to the computer system 1220 for further processing. Conversely, an output of the computer system 1220 can be provided to the satellite transmitter(s) for transmission.

The computer system 1220 can be communicatively coupled with the communications system 1210, the control system 1230, and the power system 1240. In an example, the computer system 1220 provides controls over and/or receives and processes data of the communications system 1210, the control system 1230, and the power system 1240. For instance, the computer system can process communications data of the communications system 1210, outputs attitude and position information to the control system 1230, and outputs power distribution controls to the power system 1240.

In an example, the control system 1230 maintains the satellite in a proper position within an orbit by instructing the propulsion system 1250 to control thrusters and/orient the satellite precisely to maintain the proper position. Maintaining the orbit may also include maintaining the desired nodal separations between itself and the other satellites within the satellite constellation. For instance, the control system 1230 includes tracking, telemetry, and processors for calculating and/or receiving attitude and/or orbit adjustment information.

The power system 1240 provides electrical power to other ones of the systems 1200 including the communications system 1210, the computer system 1220, the control system 1230, and the propulsion system 1250. The power system 1240 may, for example, include one or more solar panels and a supporting structure, and one or more batteries. Telemetry circuits and processors of the power system 1240 can monitor the power collection and the power consumption and can control the collection and the distribution of the electrical power to the other ones of the systems 1200.

The propulsion system 1250 may include a set of motors and set of thrusters. The propulsion system 1250 may also include a set of fuel sources, such as fuel and oxidant tanks, battery cells, liquid fuel rocket, and/or an ion-thruster system. Telemetry circuits and processors of the propulsion system 1250 can control operations of the motors, thrusters, and/or fuel sources to move and/orient the satellite.

In an example, the computer system 1220 (and, similarly, the remaining ones of the systems 1200) includes at least a processor, a memory, a storage device, communication peripherals, and an interface bus. The interface bus is configured to communicate, transmit, and transfer data, controls, and commands among the various components of the computer system 1220. The memory and the storage device include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory and the storage device also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1220.

Further, the memory includes an operating system, programs, and applications. The processor is configured to execute the stored instructions and includes, for example, a logical processing unit, a microprocessor, a digital signal processor, and other processors. The communication peripherals are configured to facilitate communication between the computer system 1220 and remaining ones of the systems 1200 and include, for example, a communications bus and/or a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A communication system, comprising:
a ground station comprising an antenna substrate;
a first phased array antenna comprising a first plurality of transmitting and receiving (TRx) antennas connected with the antenna substrate, the TRx antennas being arranged according to a first grid having a first orientation;
a second phased array antenna comprising a subset of the first plurality of TRx antennas and a second plurality of transmitting (Tx) antennas connected with the antenna substrate, the second phased array antenna sharing a common aperture with the first phased array antenna, and the Tx antennas of the second phased array antenna being arranged according to a second grid having a second orientation that is rotated with respect to the first orientation by a nonzero angle of 27 to 45 degrees, the Tx antennas being nested between the TRx antennas according to the nonzero angle; and
a controller connected with the ground station and comprising at least one processor and a memory device storing executable instructions that, when executed by the at least one processor, configure the controller to:
receive a first signal from a satellite in a downlink frequency band using the TRx antennas of the first phased array antenna; and
transmit, to the satellite and by using both the subset of the TRx antennas and the Tx antennas of the second phased array antenna, a steered beam comprising a second signal by the transmitting phased array antenna, in an uplink frequency band that is higher than the downlink frequency band.

2. The system of claim 1, wherein the memory device stores further executable instructions that, when executed by the at least one processor, configure the controller to also:
detect, based on the first signal received via the TRx antennas of the first phased array antenna, a relative position of the satellite with respect to the first phased array antenna and the second phased array antenna; and
steer a direction of the second signal transmitted by the subset of the TRx antennas and the Tx antennas of the second phased array antenna based on the detected relative position of the satellite.

3. The system of claim 1, wherein the memory device stores further executable instructions that, when executed by the at least one processor, configure the controller to also:
receive geospatial information indicative of a location of the ground station;
receive satellite path information;
adjust a scanning direction of the TRx antennas of the first phased array antenna based on the location of the system and the received satellite path information; and
steer the beam comprising the second signal by the subset of TRx antennas and the Tx antennas of the second phased array antenna based on the received geospatial information and the received satellite path information.

4. A communication device, comprising:
an antenna substrate;
a first phased array antenna comprising a first plurality of antennas connected with the antenna substrate, the first phased array antenna arranged on the antenna substrate in a first repeating arrangement having a first orientation; and
a second phased array antenna comprising a subset of the first plurality of antennas and further comprising a second plurality of antennas connected with the antenna substrate, the subset of the first plurality of antennas and the second plurality of antennas arranged on the antenna substrate in a second repeating arrangement having a second orientation that is rotated with respect to the first orientation by a nonzero angle, at least one antenna of the second plurality of antennas being nested between antennas of the subset of the first plurality of antennas, the second phased array antenna having a denser array spacing than the first phased array antenna based at least in part on the nesting.

5. The communication device of claim 4, wherein:
each antenna of the first plurality of antennas is a transmitting and receiving (TRx) antenna; and
each antenna of the second plurality of antennas is a transmitting (Tx) antenna, the communication device being configured to transmit at a first frequency band using the TRx antennas and transmit at a second frequency band using the Tx antennas and the subset of the TRx antennas.

6. The communication device of claim 4, wherein:
a first antenna of the subset of the first plurality of antennas is a transmitting and receiving (TRx) antenna;
a second antenna of a remainder of the first plurality of antennas is a receiving (Rx) antenna; and
a third antenna of the second plurality of antennas is a transmitting antenna (Tx), such that the first phased array antenna can receive, and the second phased array antenna can transmit.

7. The communication device of claim 4, wherein:
the antenna substrate comprises a first plurality of electrical connectors arranged to connect with antennas of the first phased array antenna, and a second plurality of electrical connectors arranged to connect with antennas of the second phased array antenna;
each electrical connector of the first plurality of electrical connectors and second plurality of electrical connectors is electrically connected with signal processing hardware through the antenna substrate; and
each antenna of the first plurality of antennas and second plurality of antennas is electrically connected with the signal processing hardware via a corresponding electrical connector of the first plurality of electrical connectors or the second plurality of electrical connectors.

8. The communication device of claim 4, wherein:
the first phased array antenna is coplanar with the second phased array antenna; and;
a first area corresponding to the antennas of the first phased array antenna on the antenna substrate is larger than a second area corresponding to the antennas of the second phased array antenna on the substrate, the second area being completely surrounded by the first area.

9. The communication device of claim 4, wherein at least one of the first phased array antenna and the second phased array antenna are distributed on the substrate in a circular shape, wherein an array size of the first phased array antenna or the second phased array antenna corresponds to a radius from a center of the first phased array antenna or the second phased array antenna.

10. The communication device of claim 4, wherein:
the antenna substrate comprises a printed circuit board; and
the first plurality of antennas and the second plurality of antennas comprise a series of microfabricated antenna elements integrally formed on the printed circuit board.

11. The communication device of claim 4, wherein:
the antennas of the first phased array antenna are arranged according to a first square grid; and
the antennas of the second phased array antenna are arranged according to a second square grid, the second phased array antenna rotated with respect to the first phased array antenna by an angle of approximately 45°.

12. The communication device of claim 4, wherein:
the antennas of the first phased array antenna are arranged according to a first quadrilateral grid; and
the antennas of the second phased array antenna are arranged according to a second quadrilateral grid, the second phased array antenna rotated with respect to the first phased array antenna such that the second quadrilateral grid aligns with a diagonal of the first quadrilateral grid.

13. The communication device of claim 4, wherein the first phased array antenna is rotated with respect to the second phased array antenna by a rotation offset of between 27° and 45°.

14. The communication device of claim 4, wherein:
the antennas of the first phased array antenna are arranged according to a quadrilateral grid; and
the antennas of the second phased array antenna are arranged according to a triangular grid, the second phased array antenna rotated with respect to the first phased array antenna by an angle of approximately 30°.

15. The communication device of claim 4, further comprising a third phased array antenna comprising a third plurality of phased antennas and a subset of one or both of the first plurality of antennas and the second plurality of antennas, the third phased array antenna being coplanar with the second phased array antenna and with the first phased array antenna, and the third phased array antenna having a third orientation that is rotationally offset from one or both of the first orientation and the second orientation.

16. The communication device of claim 4, wherein the first plurality of antennas and the second plurality of antennas are disposed on a same side of the substrate.

17. A method of communicating with a satellite by a ground station, the method comprising:
receiving a first signal by a first phased array antenna of the ground station, the first phased array antenna comprising a first plurality of antennas arranged on an antenna substrate in a first repeating arrangement having a first orientation; and
transmitting a second signal by a second phased array antenna of the ground station, the second phased array antenna comprising a subset of the first plurality of antennas and a second plurality of antennas, the subset of the first plurality of antennas and the second plurality of antennas connected with the antenna substrate in a second repeating arrangement having a second orientation that is rotationally offset with respect to the first orientation, each antenna of the second plurality of antennas being nested between antennas of the subset of the first plurality of antennas such that the second phased array antenna has a denser array spacing than the first phased array antenna.

18. The method of claim 17, wherein:
the first phased array antenna can receive in a first frequency band ranging from 15-20 GHz across an arc of at least 55° off boresight; and
the second phased array antenna can transmit in a second frequency band ranging from 27-30 GHz across an arc of at least 55° off boresight.

19. The method of claim 17, further comprising:
alternatingly transmitting second signal and receiving the first signal according to an alternating uplink/downlink pattern, such that the second phased array antenna does not transmit the second signal while the first phased array antenna is receiving the first signal, and the first phased array antenna does not receive the first signal while the second phased array antenna is transmitting the first signal; and
distinguishing the first signal from the second signal by time division duplexing.

20. The method of claim 17, further comprising:
transmitting the second signal by the second phased array antenna while simultaneously receiving the first signal by the first phased array antenna; and distinguishing the first signal from the second signal by frequency division duplexing.

\* \* \* \* \*